United States Patent [19]
Yamamoto et al.

[11] Patent Number: 5,530,568
[45] Date of Patent: Jun. 25, 1996

[54] MATRIX LIQUID CRYSTAL, DISPLAY DEVICE HAVING TESTING PADS OF TRANSPARENT CONDUCTIVE FILM

[75] Inventors: Hideaki Yamamoto, Tokorozawa; Kazuo Shirahashi, Mobara; Haruo Matsumaru, Hinode-machi; Michio Tsukii, Mobara, all of Japan

[73] Assignee: Hitachi, Ltd., Tokyo, Japan

[21] Appl. No.: 348,104

[22] Filed: Nov. 25, 1994

[30] Foreign Application Priority Data

Nov. 25, 1993 [JP] Japan .................... 5-295492

[51] Int. Cl.⁶ .................... G02F 1/1343; G02F 1/1345
[52] U.S. Cl. .................... 359/54; 359/87
[58] Field of Search .................... 359/54, 59, 60, 359/87, 88; 445/3, 24; 257/784; 345/87, 90, 92

[56] References Cited

U.S. PATENT DOCUMENTS

| | | | |
|---|---|---|---|
| 4,368,523 | 1/1983 | Kawate | 359/59 |
| 4,752,118 | 6/1988 | Johnson | 359/60 |
| 4,820,222 | 4/1989 | Holmberg et al. | 445/3 |
| 4,894,690 | 1/1990 | Okabe et al. | 257/59 |
| 5,146,301 | 9/1992 | Yamamura et al. | 359/59 |
| 5,187,604 | 2/1993 | Taniguchi et al. | 359/87 |
| 5,220,443 | 6/1993 | Noguchi | 359/59 |
| 5,349,226 | 9/1994 | Kawaguchi et al. | 359/87 |
| 5,359,206 | 10/1994 | Yamamoto et al. | 359/87 |

*Primary Examiner*—William L. Sikes
*Assistant Examiner*—Tai V. Duong
*Attorney, Agent, or Firm*—Antonelli, Terry, Stout & Kraus

[57] ABSTRACT

A liquid crystal display device comprises: a liquid crystal display panel including a liquid crystal interposed between first and second transparent plates; a set of conductive lines disposed on a surface of at least one of said transparent plates; and a set of electrically conductive pads connected to respective first ends of the conductive lines. Each of the conductive lines has a lower layer made of aluminum or aluminum alloy and an upper layer made of a transparent conductive film. The aluminum or aluminum alloy layers in the conductive lines do not extend into any of the layers used to construct the pads. Each pad, instead, is formed of only a transparent conductive film. Additionally, the conductive lines have respective second ends which are commonly connected to a short-circuiting line. Disposed within the line is another electrically conductive pad, constructed in the fashion the pads in the aforementioned set are constructed. The pad in the short-circuiting line advantageously functions to receive test signals from a probe individually input into the pads at the first ends of the conductive lines. A user therefore can identify faulty conductive lines by determining whether test signals input into the pads at the first end of the lines are received at the pad in the short-circuiting line.

8 Claims, 20 Drawing Sheets

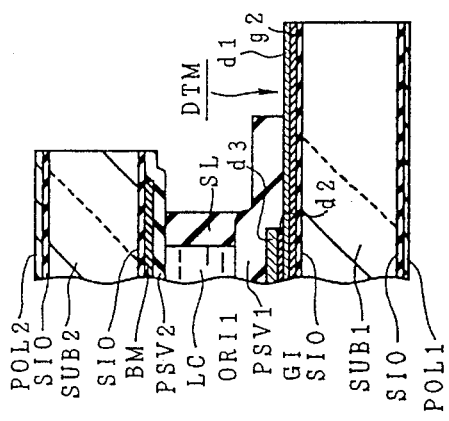
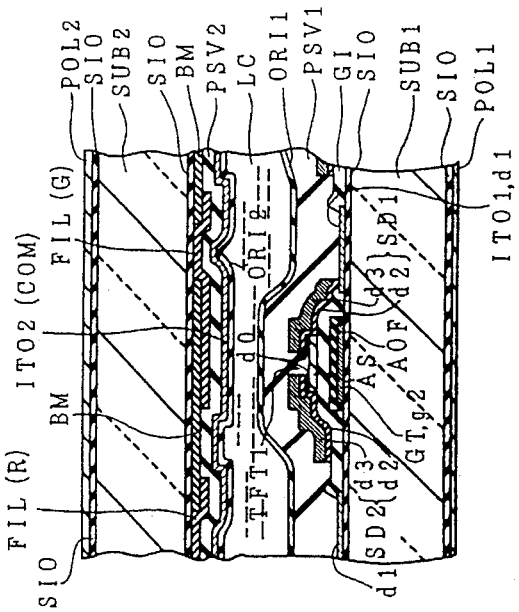
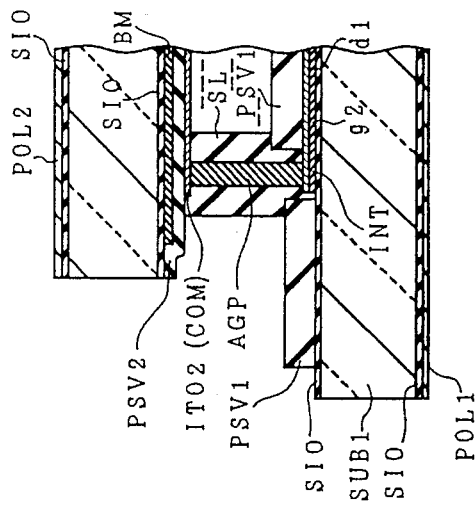

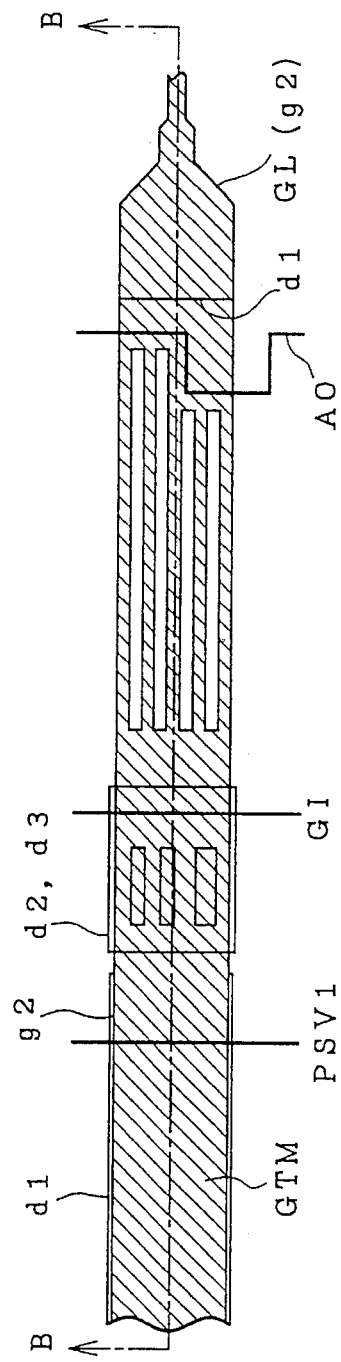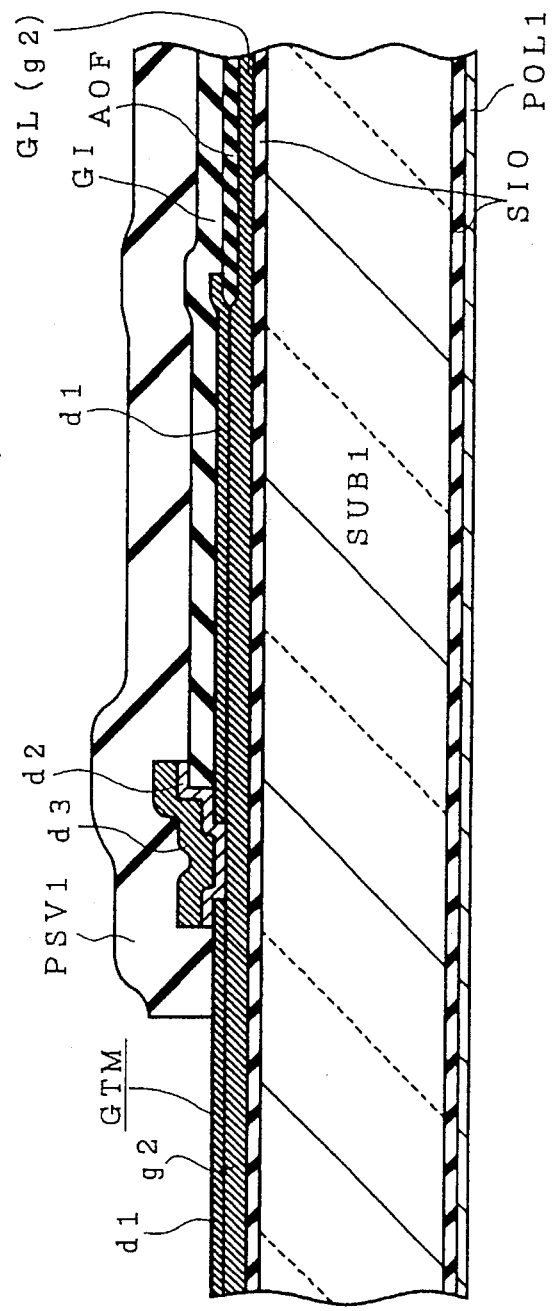
FIG. 10(A)
FIG. 10(B)

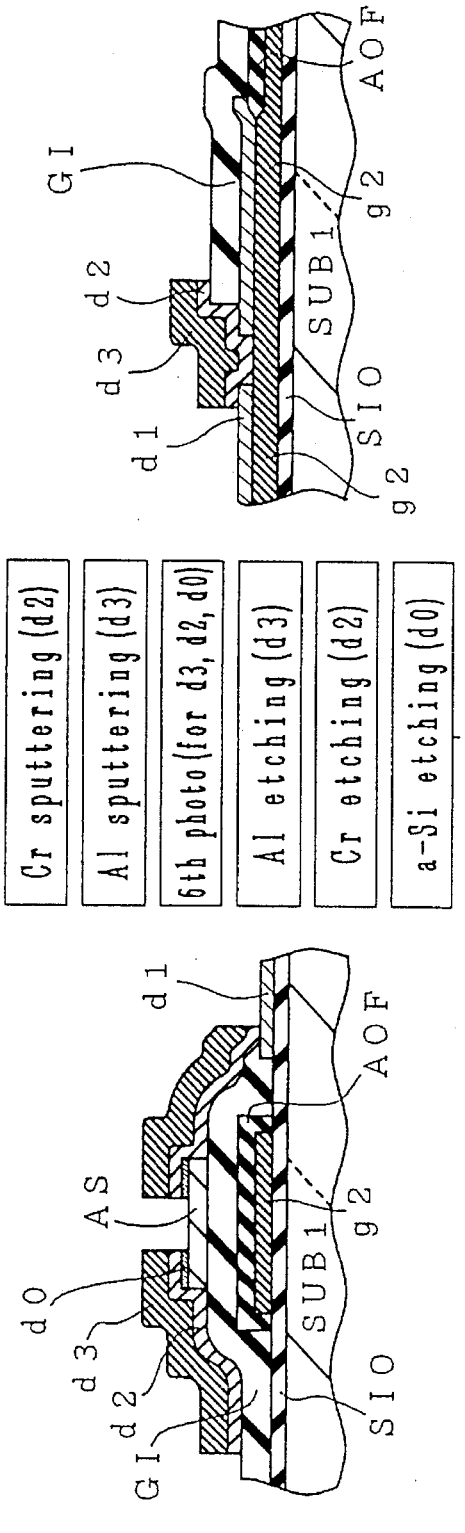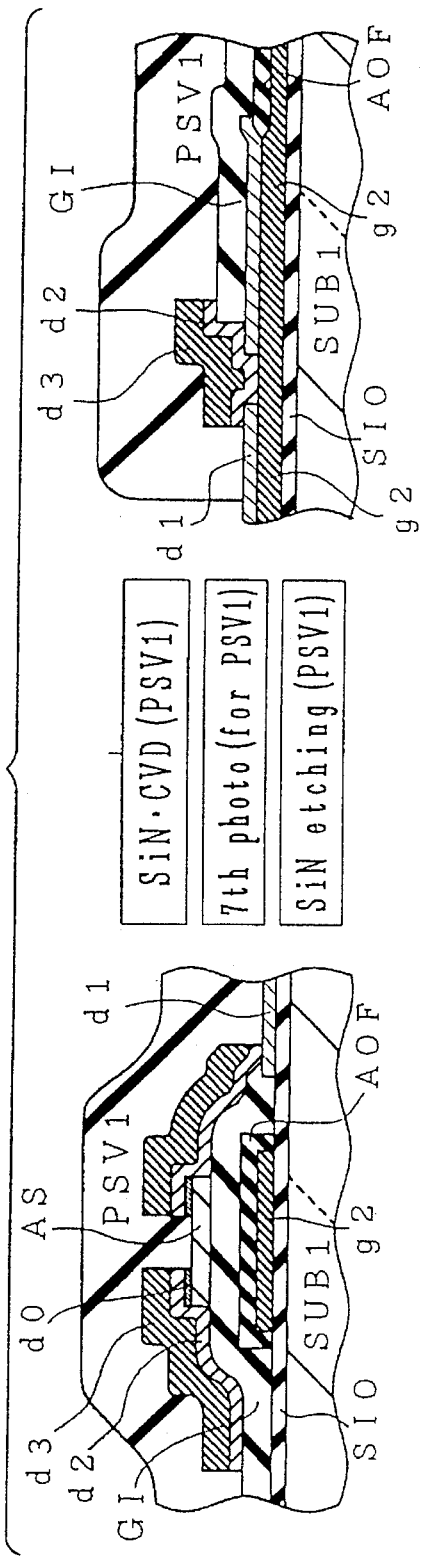

MATRIX LIQUID CRYSTAL, DISPLAY DEVICE HAVING TESTING PADS OF TRANSPARENT CONDUCTIVE FILM

BACKGROUND OF THE INVENTION

1. Field of the Invention

The present invention relates to a liquid crystal display panel and, more particularly, to a liquid crystal display panel which is equipped with testing pads for electrically testing whether or not a conductive layer has been formed without any disconnection in the manufacture process.

2. Description of the Prior Art

For example, a liquid crystal display panel of active matrix type is equipped with transparent substrates which are arranged to confront each other through a liquid crystal and one of which is formed on its main surface at the liquid crystal side with matrix-arranged pixel electrodes and thin film transistors (or switching elements) arranged close to the pixel electrodes.

There are further formed a set of conductive layers made of scanning signal lines for applying a voltage commonly to the gate electrodes of the thin film transistors of each row, and a set of conductive layers made of video signal lines for inputting signals to the pixel electrodes of each column through the thin film transistors.

Here, the scanning signal lines are usually formed of a sequential laminate of an aluminum (Al) layer or an Al alloy layer and a transparent conductive film. This transparent conductive film is formed to protect the surface of its underlying Al layer or the like and is made of the same material as that of the pixel electrodes at the common step.

Moreover, the scanning signal lines are extended at one end to the region (as located in the periphery of a transparent substrate face), which is later cut and removed, and are commonly connected at the end, while testing pads are disposed at the other end for testing whether or not the scanning signal lines are disconnected after they have been formed.

Incidentally, the liquid crystal display device of active matrix type using the thin film transistors is known in the prior art, as disclosed in Japanese Patent Laid-Open No. 309921/1988 or on pp. 193 to 210 of Nikkei Electronics entitled "Active Matrix Type Color Liquid Crystal Display of 12.5 Type Adopting Redundant Construction" and issued on Dec. 15, 1986 by NIKKEI McGRAW-HILL, for example.

SUMMARY OF THE INVENTION

In the liquid crystal display panel thus constructed, probes (or electrodes) are brought into abutment against the testing pads when the scanning signal lines are to be tested. However, the following problem has been found to occur. The material of the signal lines may be peeled from the abutting portion to stick between the adjoining scanning signal lines or the opposed electrodes to short the scanning signal lines or the two opposed substrates electrically.

Specifically, since the Al layer or the like is made of a relatively soft material and has an extremely small thickness although it is covered with a relatively hard transparent conductive film, the aforementioned probes (or electrodes) may break the transparent conductive film to peel a portion of the underlying Al layer together with the transparent conductive film.

Thus, the present invention has, as one of its objectives in view of the background described above, to provide a liquid crystal display panel which is equipped with testing pads for preventing the conductive layer from being electrically short-circuited, for example by the aforementioned peeled material.

In order to achieve this object, according to the basic concept of the present invention, there is provided a liquid crystal display device comprising: a liquid crystal display panel including a liquid crystal interposed between first and second transparent plates; and a set of conductive lines disposed on the surface of at least one of the transparent plates, each of the lines having a lower layer of aluminum or aluminum alloy and an upper layer of a transparent conductive film. The conductive lines are commonly connected at one end to a testing pad. These lines are later cut in advance of these ends to separate the conductive lines. A set of testing pads are disposed at the other end of the conductive lines. These testing pads are made of only a transparent conductive film containing neither the aluminum nor aluminum alloy.

In the liquid crystal display device thus constructed, the testing pads are formed of only the transparent conductive film containing neither the aluminum nor aluminum alloy.

As a result, even if the probes (or electrodes) are brought into abutment against the testing pads, the testing pads will not be rendered inoperable because the testing pads are formed of only the hard transparent conductive film. Thus, since there is no underlying soft layer, probes (or electrodes) brought into abutting relationship with a testing pad will not result in the breakage of the transparent conductive film of the pad and thus will not cause peeling effect realized by the prior art.

As a result, the conductive layer is not electrically short-circuited by the peeled material.

The foregoing and other objects, advantages, manner of operation and novel features of the present invention will be understood from the following detailed description when read in connection with the accompanying drawings.

BRIEF DESCRIPTION OF THE DRAWINGS

FIG. 8 is a section showing the pixel portion of the matrix at the center and the vicinities of the panel corner and the video signal portion at the two sides;

FIG. 10 presents a top plan view and a section showing the vicinity of a gate terminal GTM and a gate conductive line GL;

FIG. 15 is a flow chart presenting sections of the pixel portion and the gate terminal portion and showing Steps G to I of manufacturing the side of a substrate SUB1;

DESCRIPTION OF THE PREFERRED EMBODIMENTS

Figure 1A:
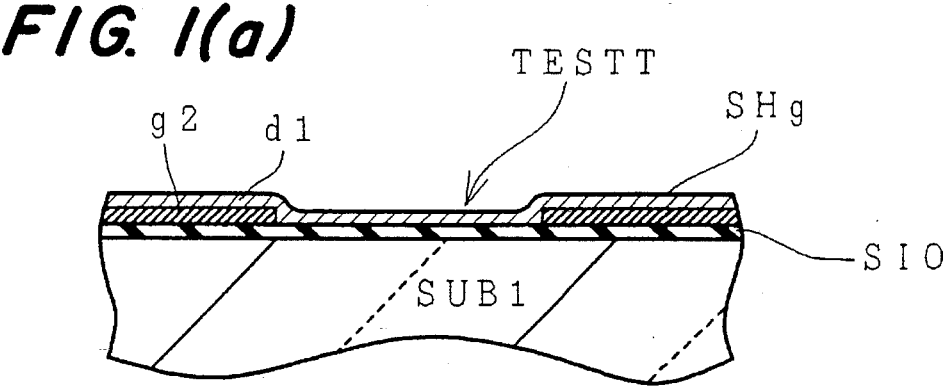
FIGS. 1(a) to 1(c) show essential portions of one embodiment of a liquid crystal display panel according to the present invention.

The other objects and further features of the present invention will become apparent from the following description to be made with reference to the accompanying drawings.

Active Matrix Liquid Crystal Display Device

Here will be described embodiments in which the present invention is applied to a color liquid crystal display device of active matrix type. Incidentally, the components having identical functions will not be repeatedly described in the following drawings by designating them at identical reference numerals.

Summary of Matrix Portion

Figure 2:
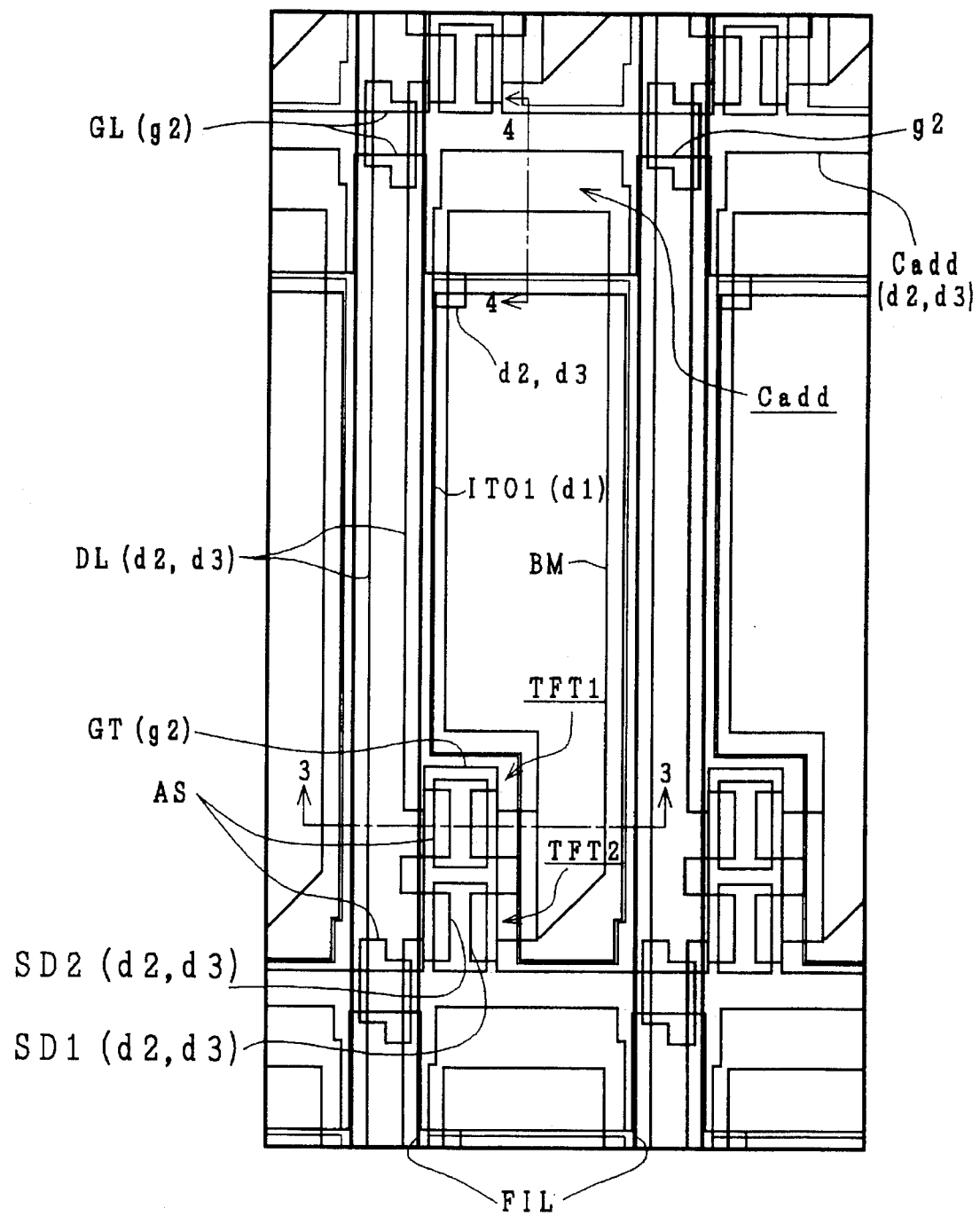
FIG. 2 is a top plan view showing an essential portion of one pixel of the liquid crystal display portion of a color liquid crystal display device of active matrix type, to which is applied the present invention, and its periphery.
Figure 3:
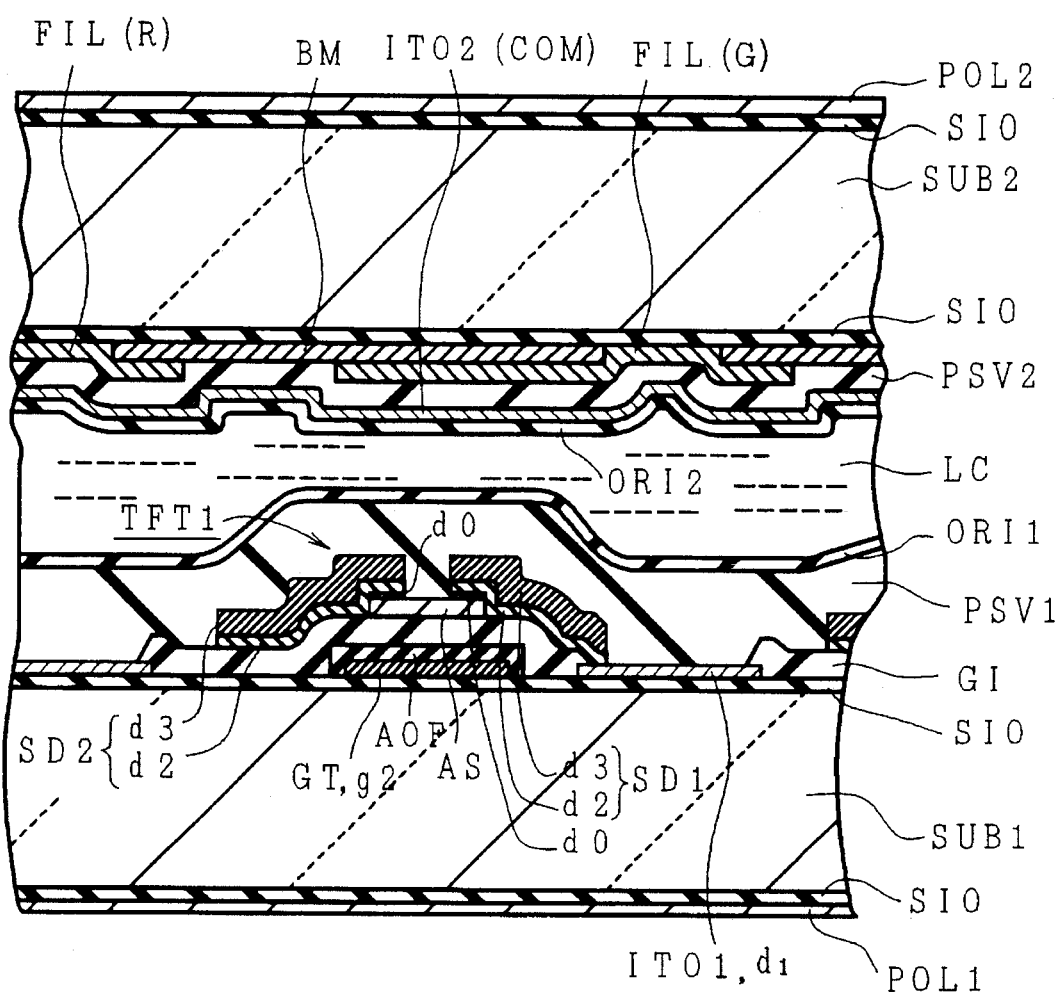
FIG. 3 is a section taken along line 3—3 of FIG. 2 and shows one pixel and its periphery.
Figure 4:
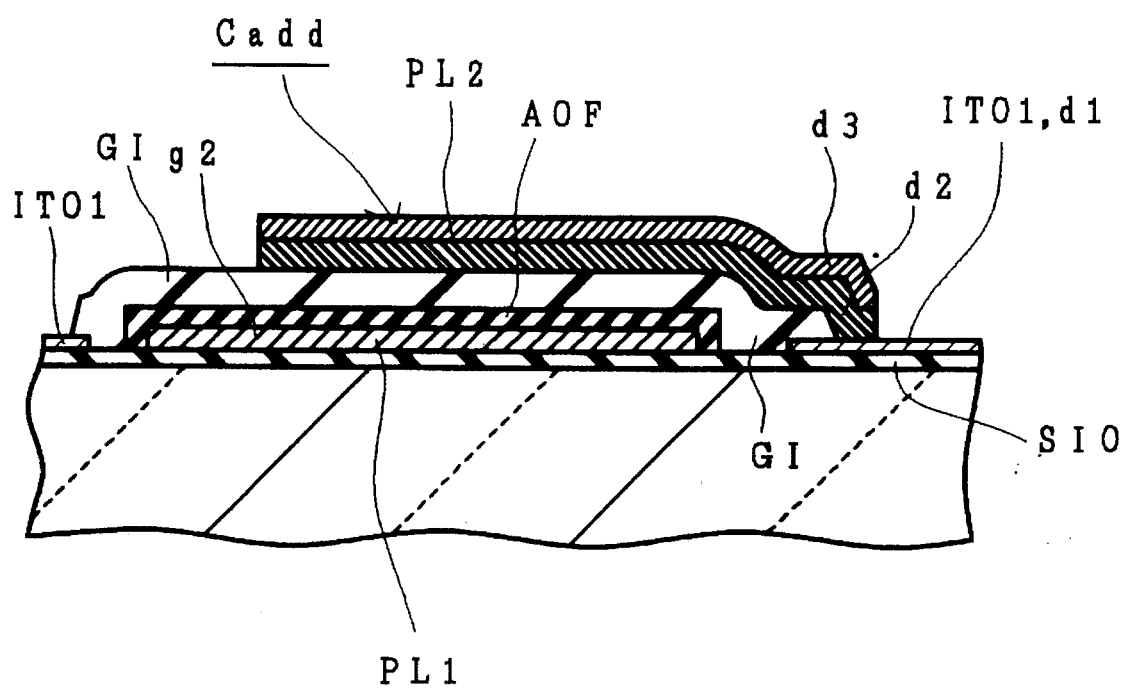
FIG. 4 is a section taken along line 4—4 of FIG. 2 and shows an added capacity Cadd.

FIG. 2 is a top plan view showing one pixel and its periphery of the color liquid crystal display device of active matrix type to which is applied the present invention; FIG. 3 is a section taken along line 3—3 of FIG. 2; and FIG. 4 is a section taken along line 4—4 of FIG. 2.

As shown in FIG. 2, each pixel is arranged in the intersecting region (as enclosed by four signal lines) between two adjoining scanning signal lines (i.e., gate signal lines or horizontal signal lines) GL and two adjoining video signal lines (i.e., drain signal lines or vertical signal lines) DL. The pixel includes a thin film transistor TFT, a transparent pixel electrode ITO1 and a latching capacity element Cadd. As shown, a plurality of scanning signal lines GL are vertically arranged to extend horizontally. A plurality of video signal lines DL are horizontally arranged to extend vertically.

With reference to a liquid crystal layer LC, as shown in FIG. 3, the thin film transistor TFT and the transparent pixel electrode ITO1 are formed at the side of a lower transparent glass substrate SUB1, and a color filter FIL and a shielding black matrix pattern BM are formed at the side of the upper transparent glass substrate SUB2. Silicon oxide films SIO are formed on the two faces of the transparent glass substrates SUB1 and SUB2 by the dipping treatment.

On the inner surface (as locates at the side of the liquid crystal LC) of the upper transparent glass substrate SUB2, there are sequentially laminated the shielding film BM, the color filter FIL, a passivation film PSV2, a common transparent pixel electrode ITO2 (COM) and an upper orientation film ORI2.

Summary of Matrix Periphery

Figure 5:
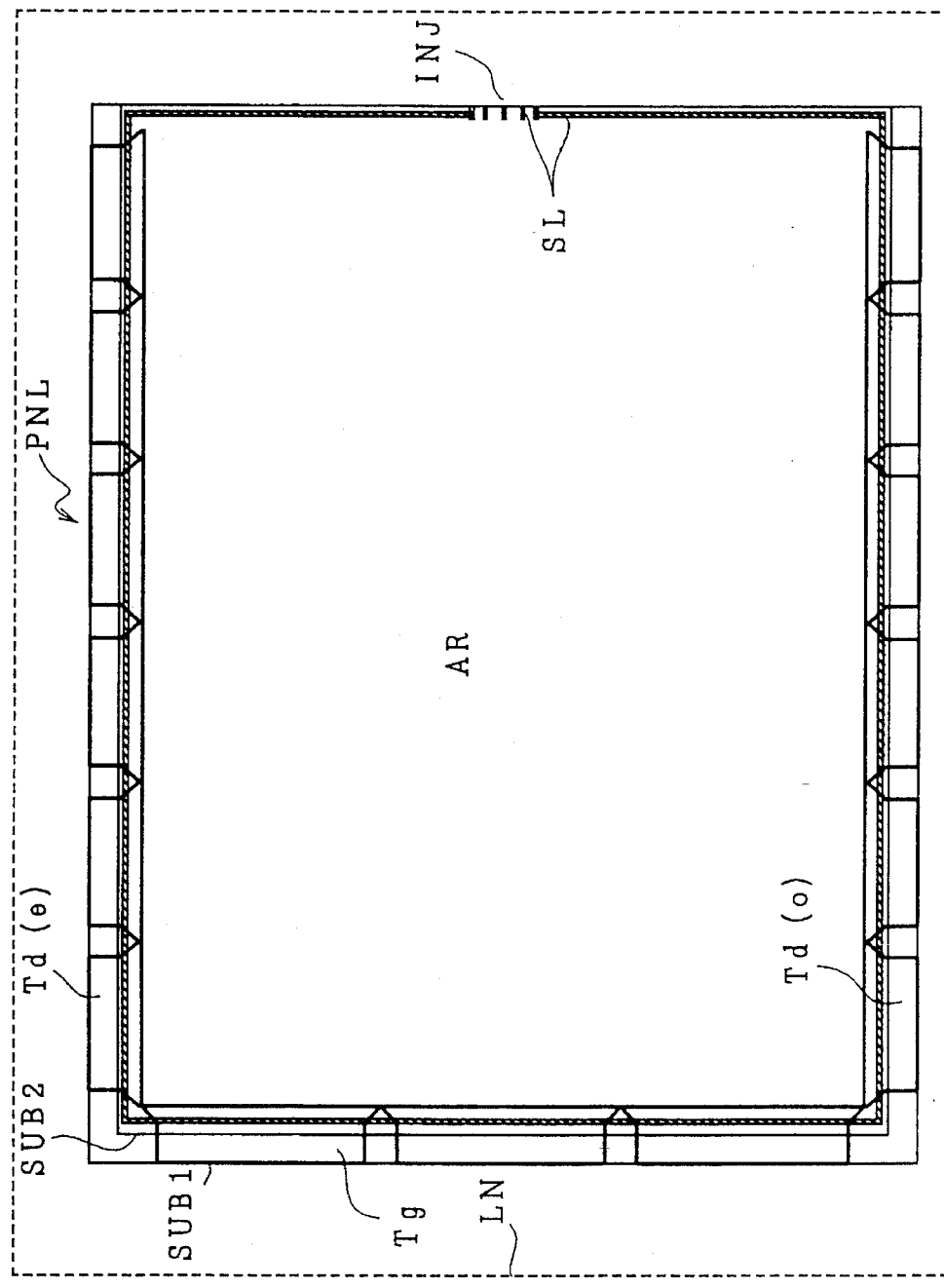
FIG. 5 is a top plan view for explaining a construction of the peripheral portion of a matrix of a display panel.
Figure 6:
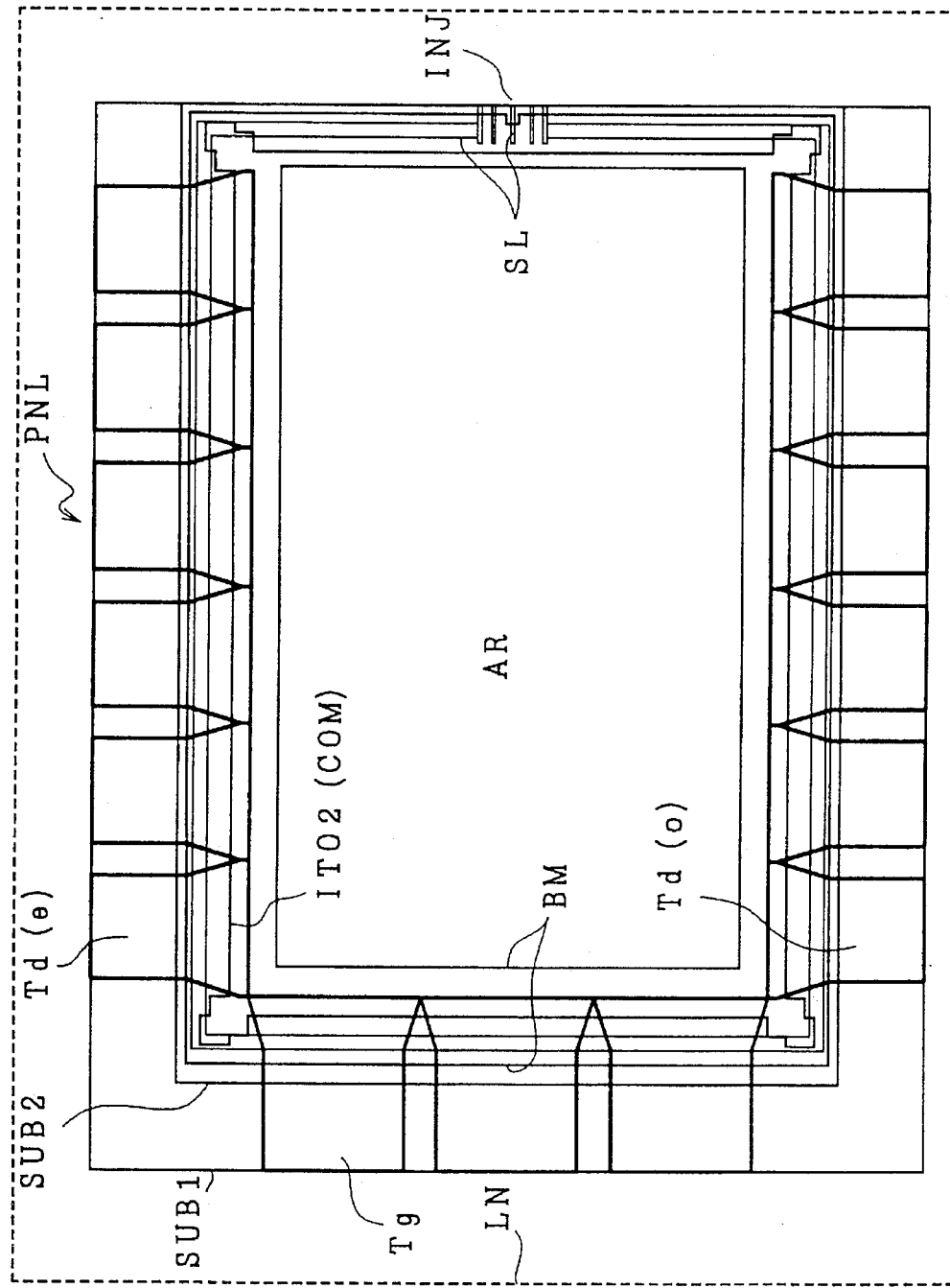
FIG. 6 is an exaggerated panel top plan view for explaining the peripheral portion of FIG. 5 specifically.
Figure 7:
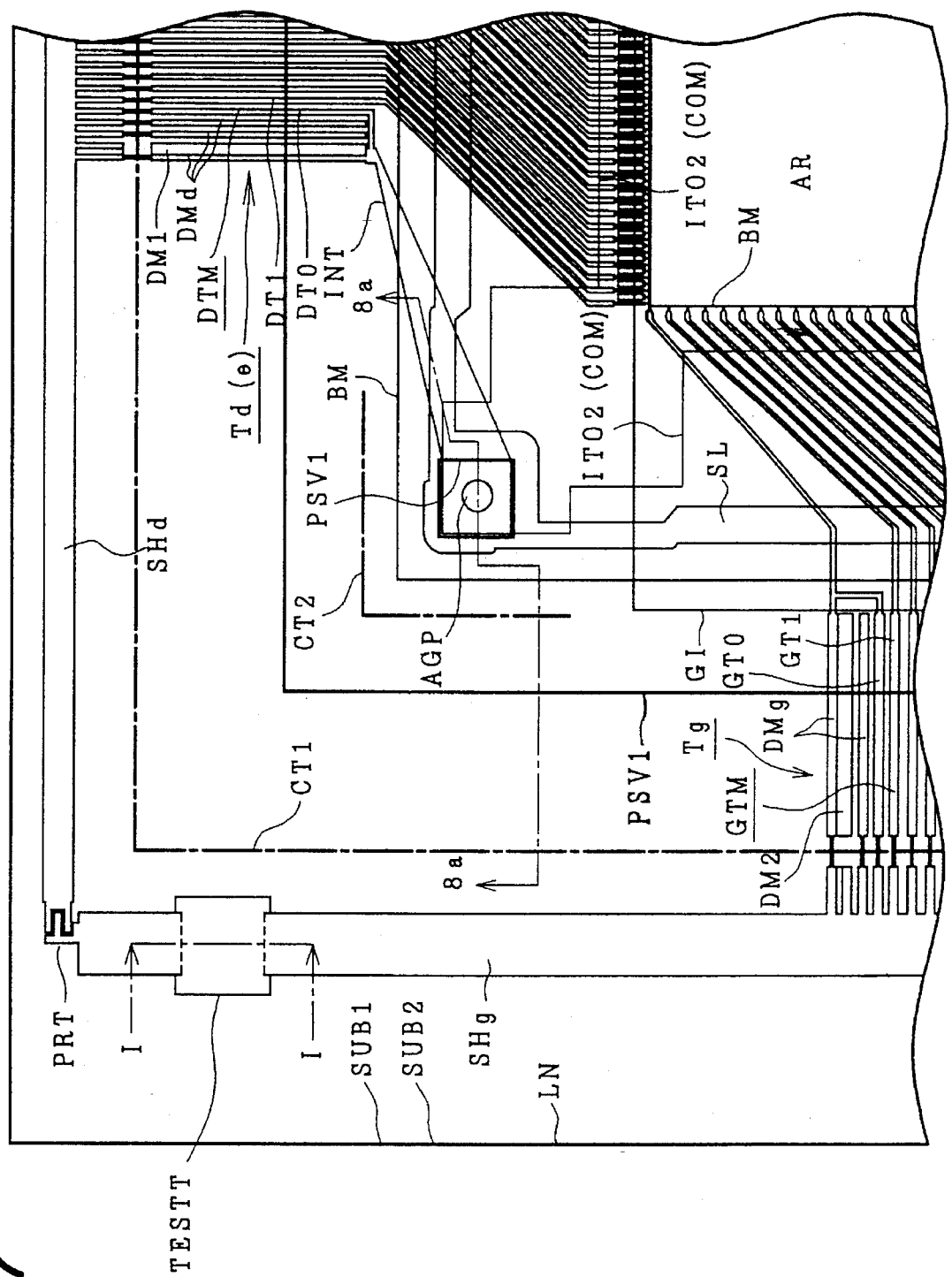
FIG. 7 is an enlarged top plan view showing a corner of the display panel including an electrically connecting portion of upper and lower substrates.
Figure 9B:
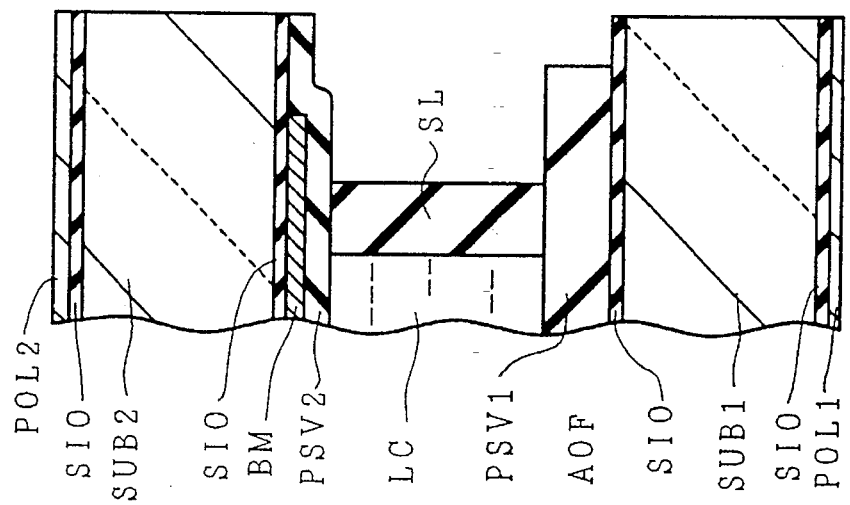
FIG. 9 is a section showing a scanning signal line at the lefthand side and the panel edge portion having no external connection terminal at the righthand side.
Figure 9A:
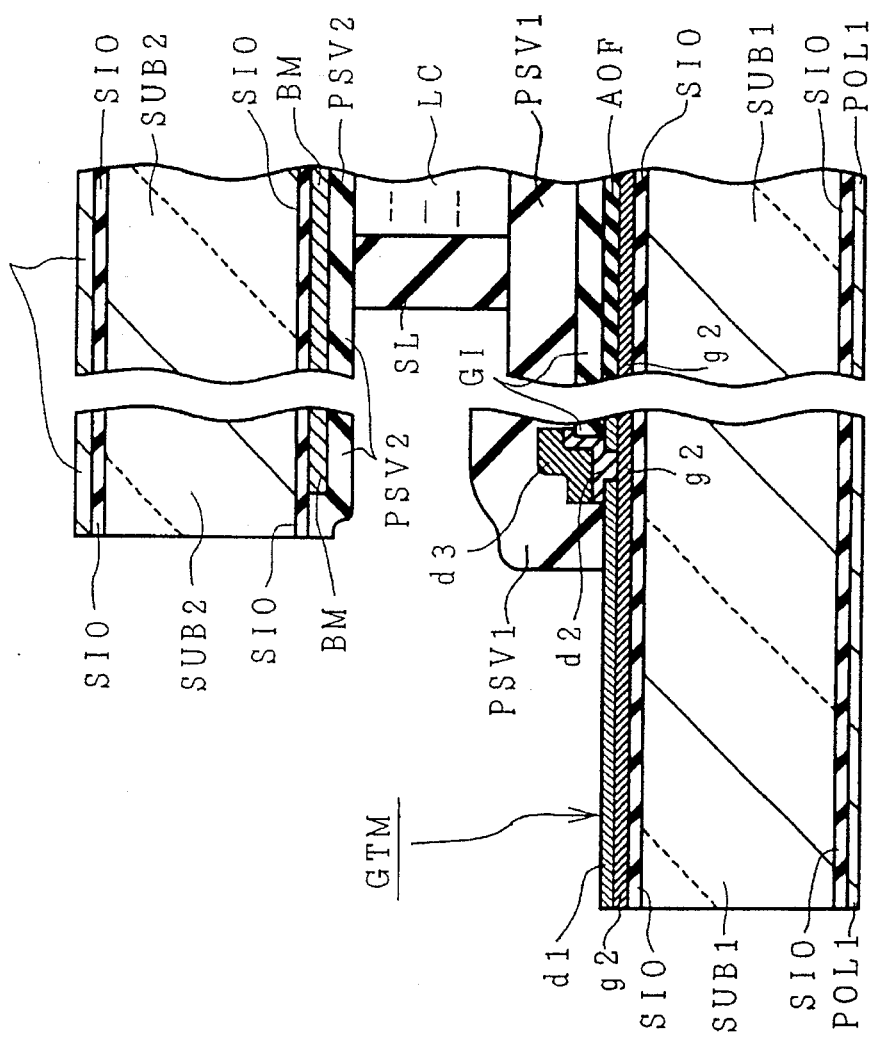

FIG. 5 is a top plan view showing an essential portion of the periphery of a matrix (AR) of a display panel PNL including the upper and lower glass substrates SUB1 and SUB2; FIG. 6 is a top plan view showing the peripheral portion in an exaggerated manner; and FIG. 7 is an enlarged top plan view showing the vicinity of a sealed portion corresponding to the lefthand upper corner of FIGS. 5 and 6. FIG. 8 presents the section of FIG. 3 at the center, the section taken along line 8a—8a of FIG. 7 at the lefthand side, and a section in the vicinity of an external connection terminal DTM to be connected with a video signal driver at the righthand side. Likewise, FIG. 9 presents a section showing the vicinity of an external connection terminal GTM to be connected with a scanning circuit at the lefthand side, and a section showing the vicinity of the seal portion having no external connection terminal at the righthand side.

Figure 18:
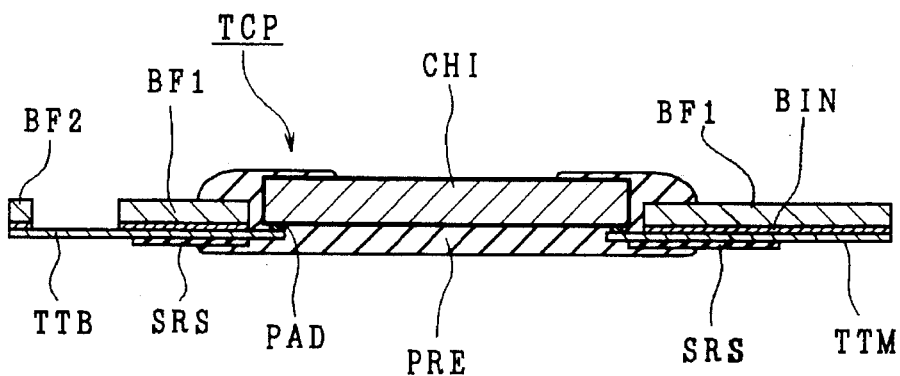
FIG. 18 is a section showing a construction of a tape carrier package TCP in which an integrated circuit chip CHI constituting the driver is packaged in a flexible wiring substrate.
Figure 19:
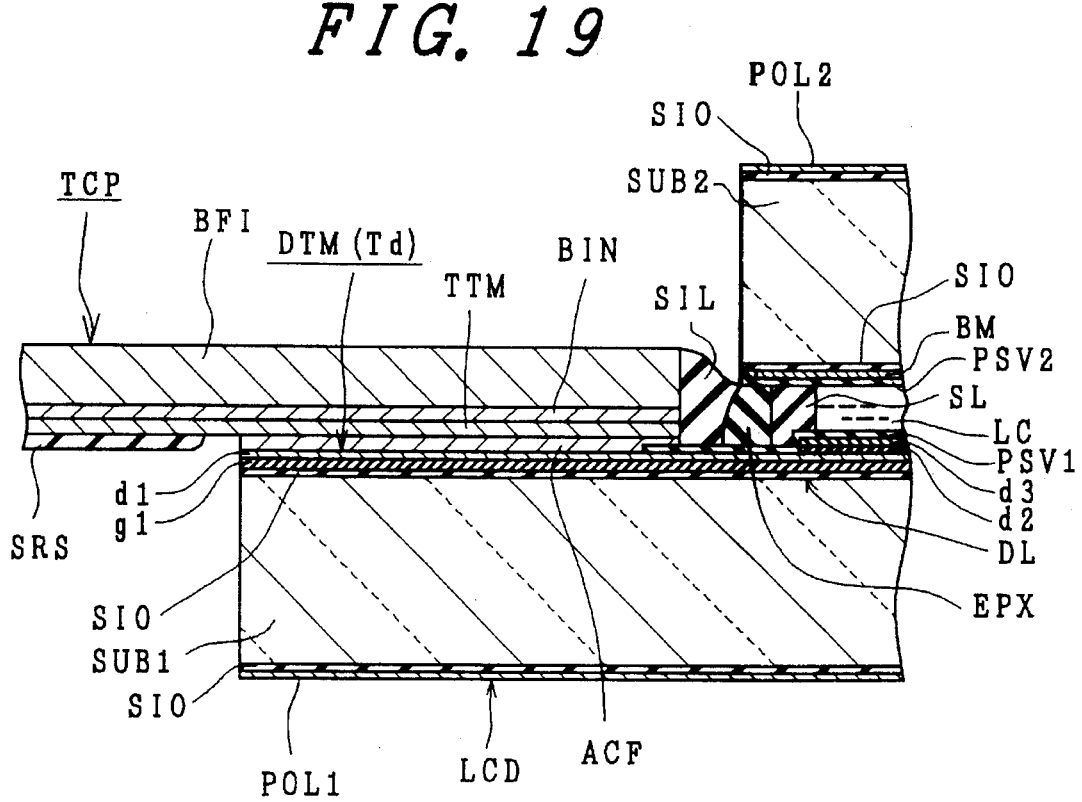
FIG. 19 is a section showing an essential portion of the state, in which the tape carrier package TCP is connected with the video signal circuit terminal DTM of the liquid crystal display panel PNL.

In the manufacture of this panel, a single sheet of glass substrate is divided after a plurality of devices have been simultaneously formed, if the panel has a small size, so as to improve the throughput. If the panel has a large size, the glass substrates standardized for each kind are formed and reduced in size for each kind so as to use the manufacture facilities commonly. In either case, the glass is cut after a series of steps have been carried out. The latter example is shown in FIGS. 5 to 7. FIGS. 5 and 6 show the upper and lower substrates SUB1 and SUB2 after being cut, and FIG. 7 shows the same before being cut. Letter LN designates the edges of the two substrates before being cut, and characters CT1 and CT2 designate the positions at which the substrates SUB1 and SUB2 are to be cut. In either case, the upper substrate SUB2 has its size restricted in the completed state within the inside of the lower substrate SUB1 so that the portions (as located at the upper and lower sides and the lefthand side), in which external connection terminal groups Tg and Td (although these suffixes are omitted), may be exposed to the outside. These terminal groups are individually named by gathering a plurality of later-described scanning circuit connecting terminals GTM and video signal circuit connecting terminals DTM and their lead-out conductive portions at the unit of a tape carrier package TCP (as shown in FIGS. 18 and 19) having an integrated circuit chip CHI packaged therein. The lead-out conductive lines from the matrix portion of each group to the external connection terminal portion is inclined toward the two ends. This is because the terminals DTM and GTM of the display panel PNL are matched to the array pitch of the package TCP and the connection terminal pitch of the display panel PNL.

Between the transparent glass substrates SUB1 and SUB2 and along their edges excepting a liquid crystal injection port INJ, there is formed a seal pattern SL for sealing the liquid crystal LC. This sealing material is exemplified by an epoxy resin. The common transparent pixel electrode ITO2 at the side of the upper transparent glass substrate SUB2 is connected, in at least its portion, e.g., at the four corners of the panel in the present embodiment, by a silver paste AGP with a lead-out conductive line INT formed at the side of the lower transparent glass substrate SUB1. This lead-out conductive line INT is formed at the same manufacture step as that of the later-described gate terminal GTM and drain terminal DTM.

The individual layers of the orientation films ORI1 and ORI2 and the transparent pixel electrode ITO1 and the common transparent pixel electrode ITO2 are formed at the inner side of the seal pattern SL. Polarizing plates POL1 and POL2 are individually formed on the outer surfaces of the lower transparent glass substrate SUB1 and upper transparent glass substrate SUB2. The liquid crystal LC is encapsulated in the region which is partitioned by the seal pattern SL between the lower orientation film ORI1 and the upper orientation film ORI2 for orienting the liquid crystal molecules. The lower orientation film ORI1 is formed over the passivation film PSV1 at the side of the lower transparent glass substrate SUB1.

This liquid crystal display device is assembled by laminating those various layers separately at the sides of the lower transparent glass substrate SUB1 and the upper transparent glass substrate SUB2, by forming the seal pattern SL at the side of the substrate SUB2, by superposing the lower transparent glass substrate SUB1 and the upper transparent glass substrate SUB2, by injecting the liquid crystal LC into the injection port INJ of the seal member SL, by encapturing the port INJ with the epoxy resin, and by cutting the upper and lower substrates.

Thin Film Transistor TFT

Returning to FIGS. 2 and 3, the construction of the TFT substrate SUB1 will now be described in detail.

The thin film transistor TFT operates to have its source-drain channel resistance decreased, if fed at its gate electrode GT with a positive bias, but increased if the bias is reduced to zero.

Each pixel is redundantly equipped with a plurality of (e.g., two) thin film transistors TFT1 and TFT2. These thin film transistors TFT1 and TFT2 are individually made to be substantially equal in size (in the channel length and width), and each of them is composed of a gate electrode GT, a gate insulating film GI, an i-type semiconductor layer AS made of i- (i.e., intrinsic to have no conduction type determining impurity doped) type amorphous silicon (Si), and a pair of source electrode SD1 and drain electrode SD2. Incidentally, the source and drain are intrinsically determined by the bias polarity inbetween, and it should be understood that the source and drain have their polarities interchanged during operation because the circuit of the liquid crystal display device has its polarity inverted during the operation. In the description to be made, however, one will be fixedly expressed as the source whereas the other will be identified as the drain for the sake of convenience.

Gate Electrode GT

The gate electrode GT is formed into a shape to protrude perpendicularly from the scanning signal line GL (as branched in the shape of letter "T"). The gate electrode GT protrudes far enough to extend beyond the individual active regions of the thin film transistors TFT1 and TFT2. These thin film transistors TFT1 and TFT2 have their individual gate electrodes GT integrally formed to merge into the scanning signal lines GL. In the present embodiment, the gate electrode GT is formed of a single-layered second conductive film g2. This second conductive film g2 is made of an aluminum (Al) film by sputtering, for example, and is overlaid by an Al anodized film AOF.

The gate electrode GT is made sufficiently so as to cover an i-type semiconductor layer AS completely (as viewed from below) so that the i-type semiconductor layer AS may be shielded from the ambient light or the back light.

Scanning Signal Line GL

The scanning signal line GL is formed of the second conductive film g2. This second conductive film g2 of the scanning signal line GL is formed at the same step as that of and made integral with the second conductive film g2 of the gate electrode GT. Over the scanning signal line GL, moreover, there is formed the anodized film AOF of Al.

Transparent Pixel Electrode ITO1

This transparent pixel electrode ITO1 forms one of the pixel electrodes of the liquid crystal display portion.

The transparent pixel electrode ITO1 is connected with both the source electrode SD1 of the thin film transistor TFT1 and the source electrode SD1 of the thin film transistor TFT2. If, therefore, one of the thin film transistors TFT1 and TFT2 gets defective to cause a side effect, a proper portion is cut by a laser beam or the like. Otherwise, the situation is left as it is, because the remaining other thin film transistor is normally operating. The transparent pixel electrode ITO1 is made of a first conductive film d1, which is formed of a transparent conductive film (or a NESA film of ITO, i.e., indium-tin-oxide) by the sputtering to have a thickness of 1,000 to 2,000 angstroms (e.g., 1,400 angstroms in the present embodiment).

Insulating Film GI

The insulating film GI is used in the thin film transistors TFT1 and TFT2 as the gate insulating film for applying an electric field to not only the gate electrode GT but also the semiconductor layer AS. The insulating film GI is formed over the gate electrode GT and the scanning signal line GL. The insulating film GI is formed of a silicon nitride film by the plasma CVD, for example, to have a thickness of 1,200 to 2,700 angstroms (e.g., about 2,000 angstroms in the present embodiment). The gate insulating film GI is so formed to enclose the entirety of the matrix portion AR, as shown in FIG. 7, and to have its peripheral portion removed to expose the external connection terminals DTM and GTM. The insulating film GI also makes a contribution to the electric insulations of the scanning signal line GL and the video signal line DL.

I-Type Semiconductor Layer AS

The i-type semiconductor layer AS is formed in the present embodiment as an independent island of each of the thin film transistors TFT1 and TFT2 and is made of amorphous silicon to have a thickness of 200 to 2,200 angstroms (e.g., about 2,000 angstroms in the present embodiment). A layer d0 is an N(+) type amorphous silicon semiconductor layer doped with phosphor (P) for the ohmic contact and is left only over the i-type semiconductor layer AS and below conductive layers d2 (or d3).

The i-type semiconductor layer AS is formed in the intersecting portion (or crossover portion) between the scanning signal line GL and the video signal line DL. This i-type semiconductor layer AS at this intersection reduces the short-circuiting between the scanning signal line GL and the video signal line DL at the intersection.

Source Electrode SD1 and Drain Electrode SD2

Each of the source electrode SD1 and the drain electrode SD2 is formed of the second conductive film d2 contacting with the N(+) type semiconductor layer d0, and the third conductive film d3 formed over the second conductive film d2.

The second conductive film d2 is formed of a chromium (Cr) film by the sputtering to have a thickness of 500 to 1,000 angstroms (e.g., about 600 angstroms in the present embodiment). The Cr film is given a thickness not exceeding the value of about 2,000 angstroms because an excessive thickness raises the stress. This Cr film is used to improve the adhesiveness to the N(+) type semiconductor layer d0 and to prevent (as the so-called "barrier layer") the Al of the third conductive film d3 from diffusing into the N(+) type semiconductor layer d0. The second conductive film d2 may be formed of not only the Cr film but also a film of refractory metal (e.g., Mo, Ti, Ta or W) or its silicide (e.g., $MoSi_2$, $TiSi_2$, $TaSi_2$ or $WSi_2$).

The third conductive film d3 is formed by sputtering Al to have a thickness of 3,000 to 5,000 angstroms (e.g., about 4,000 angstroms in the present embodiment). The Al film can be given the larger thickness with the less stress than the Cr film so that it acts to reduce the resistances of the source electrode SD1, the drain electrode SD2 and the video signal line DL and to ensure (or improve) the coverage of the step caused by the gate electrode GT or the i-type semiconductor layer AS.

After the second conductive film d2 and the third conductive film d3 have been patterned with a common mask pattern, the N(+) type semiconductor layer d0 is removed by using the same mask or by using the second conductive film d2 and the third conductive film d3 as the mask. In short, the N(+) type semiconductor layer d0 left on the i-type semiconductor layer AS is removed in self-alignment at the portion other than the second conductive film d2 and the third conductive film d3. Since, at this time, the N(+) type semiconductor layer AS is etched off to all its thickness, the i-type semiconductor layer AS is etched more or less at its surface portion, but this degree may be controlled by the etching time.

Video Signal Line DL

The video signal line DL is formed of the second conductive film d2 and the third conductive film d3, which belong to the source electrode SD1 and the drain electrode SD2.

Passivation Film PSV1

The thin film transistor TFT and the transparent pixel electrode ITO1 are overlay by the passivation film PSV1. The passivation film PSV1 used is formed of a highly transparent and moisture-resistant film mainly to protect the thin film transistor TFT against moisture or the like. The passivation film PSV1 is formed of a silicon oxide film or a silicon nitride film by the plasma CVD apparatus, for example, to have a thickness of about 1 μm.

The passivation film PSV1 is formed to enclose the entirety of the matrix portion AR, as shown in FIG. 7, and is removed not only at its peripheral portion so as to expose the external connection terminals DTM and GTM to the outside but also at the portion where the common electrode COM of the upper substrate SUB2 is connected with the lead-out conductive line INT for the external connection terminal of the lower substrate SUB1 by the silver paste AGP. As to the thickness, the passivation film PSV1 is made thick while considering the passivation effect, but the gate insulating film GI is made thin while considering the mutual conductance gm of the transistor. As shown in FIG. 7, therefore, the passivation film PSV1 having a high passivation effect is made so larger than the gate insulating film GI as to passivate the peripheral portion as wide as possible.

Shielding Film BM

At the side of the upper transparent glass substrate SUB2, there is formed the shielding film BM for shielding the i-type semiconductor layer AS from the ambient light or back light. The closed polygonal contour of the shielding film BM shown in FIG. 2 defines the opening which is not formed therein with the shielding film BM. This shielding film BM is formed of an aluminum film or a chromium film having a high shielding property against the light and is formed in the present embodiment of a chromium film having a thickness of about 1,300 angstroms by the sputtering.

As a result, the i-type semiconductor layer AS of the thin film transistors TFT1 and TFT2 is sandwiched between the overlying shielding film BM and the underlying larger gate electrode GT so that it is protected against the ambient natural light or the back light. The shielding film BM is formed in the matrix form (as called the "black matrix") around the individual pixels to define the effective display area of one pixel. As a result, the individual pixels have their contours made clear by the shielding film BM to improve the contrast. In short, the shielding film BM has the two functions to shield the i-type semiconductor layer AS and to act as the black matrix.

Since the edge portion of the transparent pixel electrode ITO1 at the root side in the rubbing direction (as located at the righthand lower portion of FIG. 2) is also optically shielded by the shielding film BM, any domain, if established, will not appear to keep the display characteristics out of degradation.

The shielding film BM is also formed in a frame shape in the peripheral portion, as shown in FIG. 6, but to merge into the pattern of the matrix portion having a plurality of dotted openings, as shown in FIG. 2. The shielding film BM in the peripheral portion is extended to the outside of the seal portion SL, as shown in FIGS. 6 to 9, to shield the matrix portion from the stray light such as the reflected light coming from the packaged device such as a personal computer. On the other hand, the shielding film BM has its extension internally restricted by about 0.3 to 1.0 mm within the edges of the substrate SUB2 while avoiding the cut region of the substrate SUB2.

Color Filter FIL

The color filter FIL is formed in a striped shape at positions confronting the pixels by repeating red, green and blue colors. The color filter FIL is made so large as to cover the transparent pixel electrode ITO1 as a whole, and the shielding film BM is so formed inside of the peripheral edge portions of the transparent pixel electrode ITO1 as to overlap the edge portions of the color filter FIL and the transparent pixel electrode ITO1.

The color filter FIL can be formed in the following manner. First of all, a dyeing base of an acrylic resin is formed on the surface of the upper transparent glass substrate SUB2 and is then removed except the red filter forming region by the photolithography. After this, the dyeing base is dyed with a red dye and fixed to form a red filter R. Next, a green filter G and a blue filter B are sequentially formed by similar steps.

Passivation Film PSV2

The passivation film PSV2 is formed to prevent the dye of the color filter FIL from leaking into the liquid crystal LC. The passivation film PSV2 is made of a transparent resin material such as an acrylic resin or an epoxy resin.

Common Transparent Pixel Electrode ITO2

The common transparent pixel electrode ITO2 confronts the transparent pixel electrode ITO1 disposed for each pixel at the side of the lower transparent glass substrate SUB1, and the optical state of the liquid crystal LC changes in response to the potential difference (or electric field) between each pixel electrode ITO1 and the common transparent pixel electrode ITO2. This common transparent pixel electrode ITO2 is constructed to be fed with a common voltage Vcom. In the present embodiment, this common voltage Vcom is set to an intermediate DC potential between the minimum level drive voltage Vdmin and the maximum level drive voltage Vdmax applied to the video signal line DL. In case, however, the supply voltage of the integrated circuit to be used in the video signal driver is to be reduced to about one half, an AC voltage may be applied. Incidentally, the top plan shape of the common transparent pixel electrode ITO2 should be referred to FIGS. 6 and 7.

Structure of Latching Capacity Element Cadd

The transparent pixel electrode ITO1 is so formed at the end portion opposed to that to be connected with the thin film transistor TFT as to be connected with the second conductive film d2 and the third conductive film d3 and to overlap the adjoining scanning signal line GL. This overlap constitutes the latching capacity element (or electrostatic capacity element) having one electrode PL2 of the transparent pixel electrode ITO1 and the other electrode PL1 of the adjoining scanning signal line GL. This latching capacity element Cadd has its dielectric film made of the insulating film GI used as the gate insulating film of the thin film transistor TFT and the anodized film AOF.

The latching capacity element Cadd is formed in the widened portion of the second conductive film g2 of the scanning signal line GL. Incidentally, the second conductive film g2 is thinned at its portion intersecting the video signal line DL so as to reduce the probability of short-circuiting with the video signal line DL.

Gate Terminal Portion

FIG. 10 is a diagram showing a connection structure of the display matrix from the scanning signal line GL to the external connection terminal GTM. In FIG. 10, (A) presents a top plan view, and (B) presents a section taken along line B—B of (A). Incidentally, FIG. 10 corresponds to the lower portion of FIG. 7 and illustrates the oblique conductive lines conveniently in the shape of one straight line.

Letters AO designate a photographic mask pattern or a selective anodizing photoresist pattern. As a result, this photoresist is removed after the anodization so that the shown pattern AO is not left as an item. In the gate conductive line GL, however, the oxide film AOF is selectively formed, as shown in the section, so that its locus is left. In the top plan view, the lefthand side of the photoresist with respect to the boundary AO is the region which is covered with the resist so that it is not anodized, and the righthand side is the region which is exposed from the resist so that it is anodized. The anodized Al layer g2 has its surface formed with its oxide $Al_2O_3$ film and its lower conductive portion reduced in volume. It is quite natural that the anodization is so carried out for a proper time period and at a proper voltage that the conductive portion may be left. The mask pattern AO intersects the scanning line GL not in a simple straight line but in a crank shape.

In FIG. 10, the Al layer g2 is hatched to facilitate understanding, but the region left unanodized is patterned in a comb shape. This patterning is intended to minimize the probability of disconnection and the sacrifice of conductivity while preventing generation of whiskers by bundling a plurality of Al layers in parallel while thinning them, because the whiskers are generated on the wide surfaces of the Al layers. In the present embodiment, therefore, the portion corresponding to the root of the comb is shifted along the mask AO.

The gate terminal GTM is formed of the Al layer g2 having an excellent adhesiveness to the silicon oxide SiO film, and the transparent conductive layer d1 protecting the surface of the Al layer g2 and having the same level (i.e., in the same layer and at the same time) as that of the pixel electrode ITO1. Incidentally, the conductive layers d2 and d3 formed over the gate insulating films GI and ITO film d1 are provided for connecting the gates Al and ITO film d1 electrically.

In the top plan view, not only the gate insulating film GI but also the passivation film PSV1 is formed at the righthand side of the boundary, and the terminal portion GTM located at the lefthand end is so exposed to the outside that it can be connected with the external circuit. Although the gate line GL and the gate terminal are shown as only being one pair, a plurality of these elements are actually arranged vertically, as shown in FIG. 7, to constitute the terminal group Tg (as shown in FIGS. 6 and 7), and the gate terminal has its lefthand end extended in the manufacturing process over the cut region CT1 of the substrate until it is short-circuited by a conductive line SHg is used. This short-circuiting line SHg in the manufacturing process to supply the electricity for the anodization and to prevent the orientation film ORI1 from being electrostatically broken during rubbing.

Moreover, the short-circuiting line SHg is formed to include a portion serving as a testing pad TESTT. This testing pad TESTT is used for testing the disconnection of the already formed scanning signal line GL by bringing a not-shown probe (or electrode) into abutment and by feeding it with electricity.

FIG. 1(a) is a section taken along line I—I of FIG. 7. In FIG. 1(a), the short-circuiting line SHg is constructed of a laminate having the Al layer g2 and the ITO layer d1 sequentially laminated. In the region of said testing pad TESTT, however, the Al layer g2 is not formed as the underlying layer, but only the ITO layer d1 is formed.

Figure 1B:
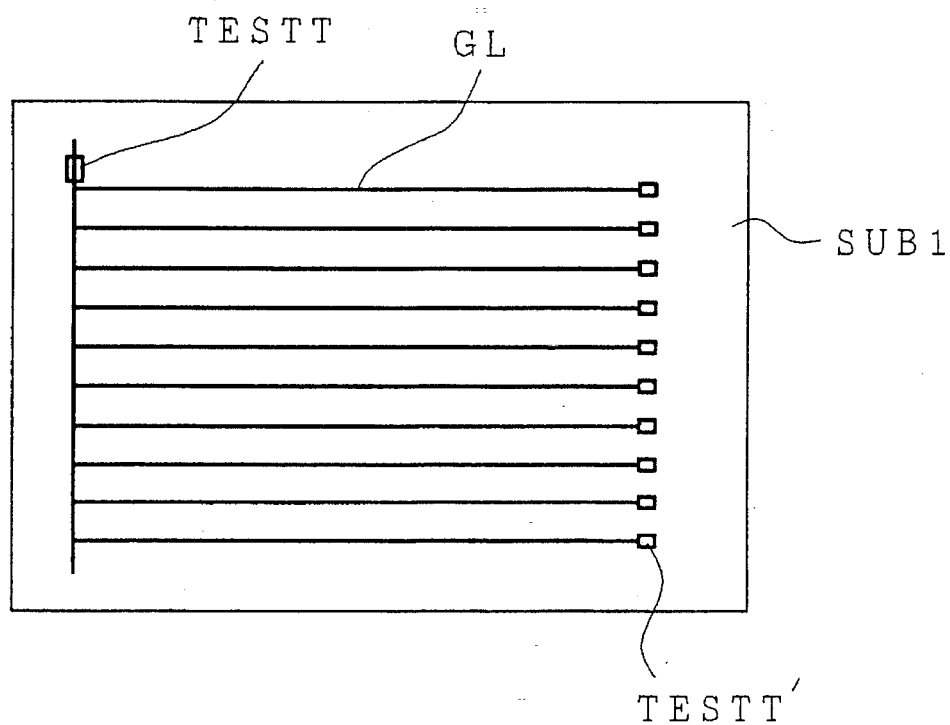
Figure 1C:
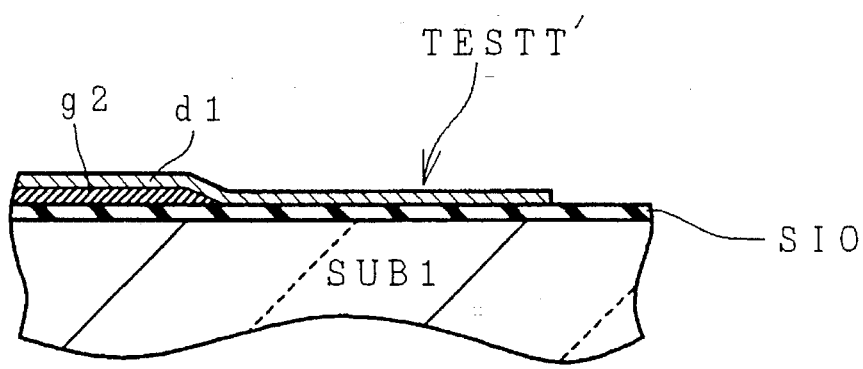

On the other hand, FIGS. 1(b) and 1(c) show the testing pad TESTT' to be arranged at the other end of the gate conductive line and its sectional structure. Likewise, the testing pad TESTT' is formed of not the Al layer g2 but only the ITO layer d2.

Thanks to this construction, even with the probe (or electrode) abutting against said testing pad TESTT, there is nothing but the ITO film d1 having no relatively soft underlying layer, so that the abutment will not break the ITO film d1 thereby to form no peeled material, unlike the prior art.

As a result, it is prevented that such peeled material sticks between the adjoining scanning signal lines GL to cause an electric short-circuiting between the scanning signal lines GL or between the two substrates arranged to confront each other.

In the description made above, the underlying layer of the ITO film d1 is made of the Al or Al alloy layer g2 but may naturally be made of an Al alloy containing one metal of Ta, Ti, or both of Ta and Ti (in 0.4 to 8.5 wt. %). These alloys of Al—Ta, Al—Ti, or Al—Ti—Ta have superior durability in heat treatment by preventing generation of whiskers and hillocks, and have superior reproducivity in forming sloped end portion of Al alloy film due to etching anisotropy.

Figure 21:
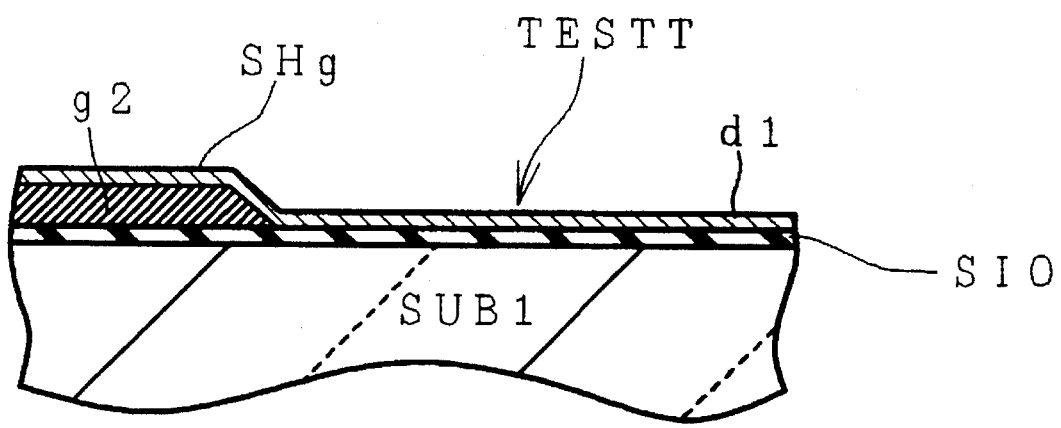
FIG. 21 is a section showing another embodiment of a liquid crystal display panel according to the present invention.

Since, in this case, the Al alloy layer g2 is formed to have a sloped end portion due to the etching anisotropy, as shown in FIG. 21, it can prevent the ITO film d1, which is formed from the upper face of the Al alloy layer g2 to the surface of the silicon oxide film SIO, from being stepwise broken. The aforementioned effect is remarkably prominent because the ITO film d1 has a thickness as small as about 1,000 angstroms contrary to the Al alloy layer g2 having a thickness of about 3,000 angstroms.

Although, moreover, the aforementioned Al layer or Al alloy layer g2 is formed of one layer, similar effects could be achieved even if it should be a laminate of a Cr layer and an Al layer or the Al alloy layer g2.

Incidentally, such testing pad TESTT could naturally be formed at the side of the video signal lines DL.

Drain Terminal DTM

Figures 11A, 11B:
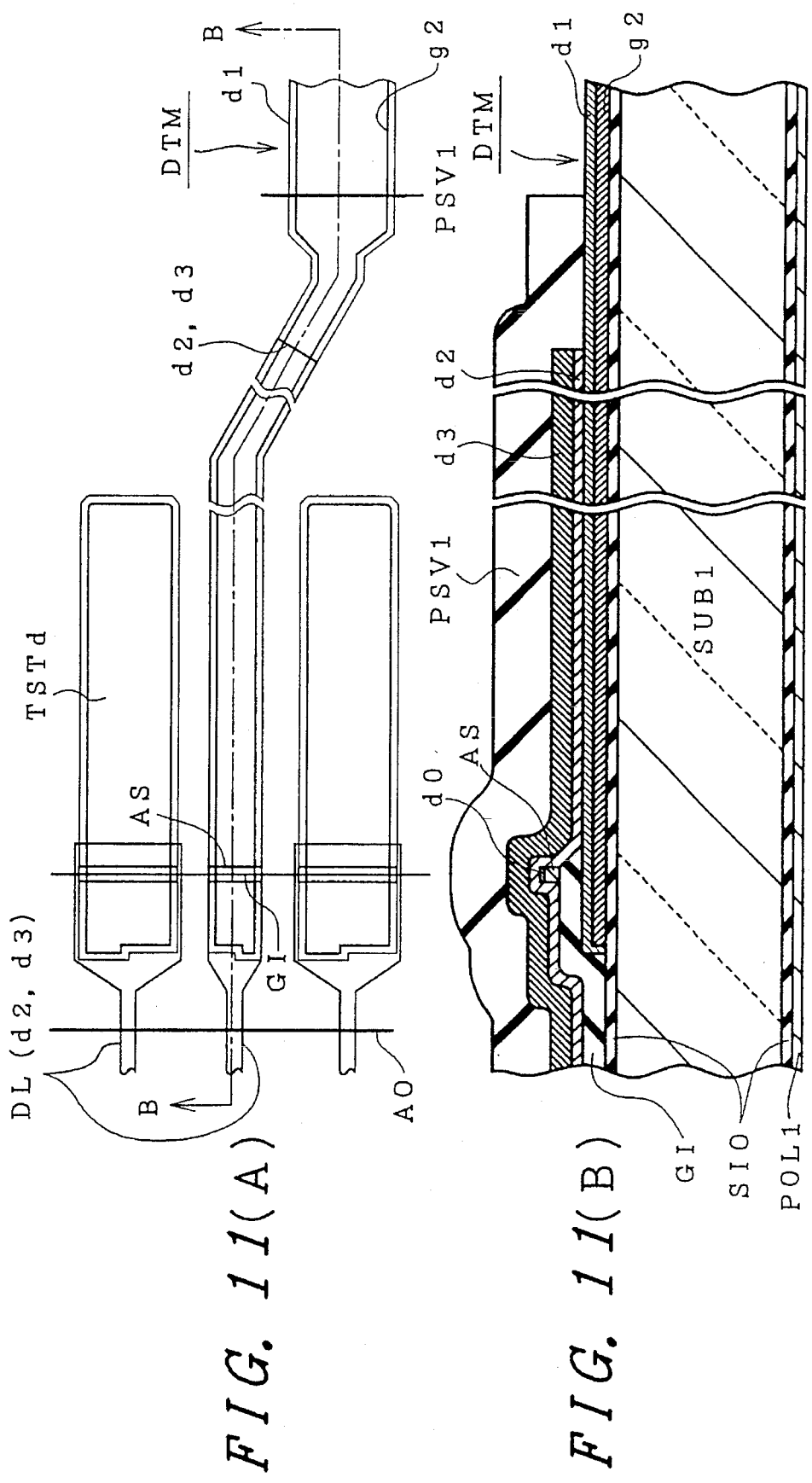
FIG. 11 presents a top plan view and a section showing the vicinity of a drain terminal DTM and a video signal line DL.

In FIG. 11 showing the connection from the video signal line DL to the external connection terminal DTM, (A) presents a top plan view, and (B) presents a section taken along line B—B of (A). Incidentally, FIG. 11 corresponds to the righthand upper portion of FIG. 7 such that the righthand end direction corresponds to the upper end portion (or lower end portion) of the substrate SUB1, although the drawing direction is conveniently changed.

Letters TSTd designate a test terminal, which is not connected with the external circuit but is made so wider than the conductive portion that the probe may contact. Likewise, the drain terminal DTM is also so made wider than the conductive portion that it may be connected with the external terminal. Pluralities of test terminals TSTd and external connection drain terminals DTM are vertically staggered in an alternate manner such that the test terminals TSTd do not reach the end portion of the substrate SUB1 but terminate, as shown, whereas the drain terminals DTM constitute the terminal group Td (although the suffix is omitted), as shown in FIG. 7, and extended further across the cut line CT1 of the substrate SUB1. In the manufacture process, all of them are short-circuited to each other by conductive lines SHd so that they may be protected from the electrostatic breakage. The drain connection terminal is connected with the video signal line DL opposite to the test terminal TSTd across the matrix, whereas the test terminal is connected with the video signal line DL opposite to the drain connection terminal DTM across the matrix.

For the same reason as that of the aforementioned gate terminal GTM, the drain connection terminal DTM is formed of two layers, i.e., the Al layer g2 and the ITO layer d1, and is connected with the video signal line DL at the portion from which is removed the gate insulating film GI. The semiconductor layer AS formed over the end portion of the gate insulating film GI is used for etching the edge of the gate insulating film GI into a taper shape. The passivation film PSV1 is naturally removed from above the terminal DTM so as to enable the connection with the external circuit. The letter AO designates the aforementioned anodizing mask which has its boundary formed to enclose the matrix entirety sufficient, and the lefthand side of the boundary is covered with the mask, as shown. This pattern has no direct relation because the layer g2 is not present at the portion of FIG. 11, which is left uncovered.

The lead-out conductive line from the matrix portion to the drain terminal portion DTM has a structure, as also shown in FIG. 8(C), in which the layers d2 and d3 at the same level as that of the video signal line DL are laminated midway of the seal pattern SL just over the layers d1 and g2 at the same level as that of the drain terminal portion DTM. This structure is intended to minimize the probability of disconnection thereby to protect the electrolytically corrosive Al layer d3 as much as possible with the passivation film PSV1 and the seal pattern SL.

Equivalent Circuit of Entire Display Device

Figure 12:
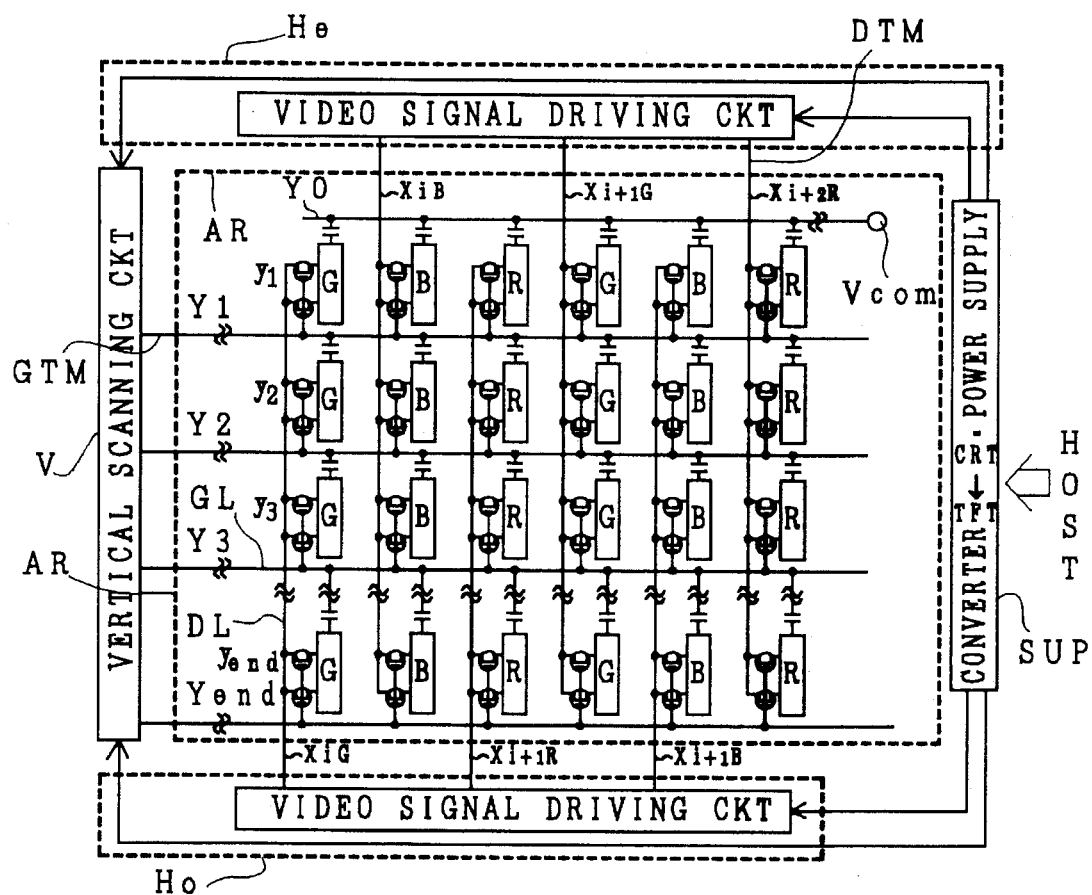
FIG. 12 is a circuit diagram showing the matrix portion of the color liquid crystal display device of active matrix type and its periphery.

FIG. 12 is a diagram showing an equivalent circuit of the display matrix portion and its peripheral circuit. FIG. 12 presents a circuit diagram which is drawn to correspond to the actual geometric arrangement. The letters AR designate the matrix array which is arrayed two-dimensionally with a plurality of pixels.

In FIG. 12, letter X designates the video signal line DL, to which are added suffixes G, B and R corresponding to the green, blue and red pixels. Letter Y designates the scanning signal line GL, to which are added suffixes 1, 2, 3, - - -, and end according to the scanning timing sequence.

The video signal lines X (having their suffixes omitted) are alternately connected with the upper (or odd) video signal drivers He and the lower (or even) video signal drivers Ho.

The scanning signal lines Y (having their suffixes omitted) are connected with a vertical scanning circuit V.

Letters SUP designate a circuit including a power supply for establishing a plurality of stable voltage sources divided from one voltage source, and a circuit for converting the information for the CRT (i.e., Cathode Ray Tube) from the host (i.e., host arithmetic processor) into the information for the TFT liquid crystal display device.

Actions of Latching Capacity Element Cadd

This latching capacity element Cadd acts to reduce the influences of a gate potential change $\Delta Vg$ upon the middle point potential (or pixel electrode potential) V1c when the thin film transistor TFT is switched, as will be expressed by the following Equation:

$$\Delta V1c = \{Cgs/(Cgs+Cadd+Cpix)\} \times \Delta Vg. \qquad \text{[Eq. 1]}$$

Here: Cgs: a parasitic capacity to be established between the gate electrode GT and the source electrode SD1 of the thin film transistor TFT; Cpix: a capacity to be established between the transparent pixel electrode ITO1 (PIX) and the common transparent pixel electrode ITO2 (COM); and $\Delta V1c$: a change in the pixel electrode potential due to $\Delta Vg$. This change $\Delta V1c$ causes the DC component to be applied to the liquid crystal LC and can have its value made the smaller for the higher latching capacity Cadd. Moreover, the latching capacity element Cadd acts to elongate the discharge time and stores the video information after the thin film transistor TFT has been turned OFF, for a long time. The reduction of the DC component to be applied to the liquid crystal LC can elongate the lifetime of the liquid crystal LC and can reduce the so-called "printing" in which the preceding image is left at the switching time of the liquid crystal display.

As described hereinbefore, the gate electrode GT is enlarged to cover the i-type semiconductor layer AS completely so that the overlap area with the drain electrode SD2 is accordingly enlarged to increase the parasitic capacity Cgs, thus causing an adverse effect that the middle point potential V1c grows liable to be influenced by the gate (scanning) signal Vg. However, this demerit can be eliminated by providing the latching capacity element Cadd.

The latching capacity element Cadd has its latching capacity set to four to eight times as high as the liquid crystal capacity Cpix (e.g., 4. Cpix<Cadd<8.Cpix) and eight to thirty two times as high as the parasitic capacity Cgs (e.g., 8.Cgs<Cadd<32.Cgs).

The first-stage scanning signal line GL ($Y_0$) to be used only as the latching capacity electrode line is set to the same potential as that of the common transparent pixel electrode ITO2 (Vcom). In the example of FIG. 7, the first-stage scanning signal line is short-circuited to the common electrode COM through the terminal GTO, the lead-out line INT, the terminal DTO and the external conductive line. Alternatively, the latching capacity electrode line $Y_0$ at the first stage may be connected with the scanning signal line Yend at the final stage or the DC potential point (or AC grounded point) other than Vcom or connected to receive one more scanning pulse $Y_0$ from the vertical scanning circuit V.

Manufacture Method

Figure 13A:
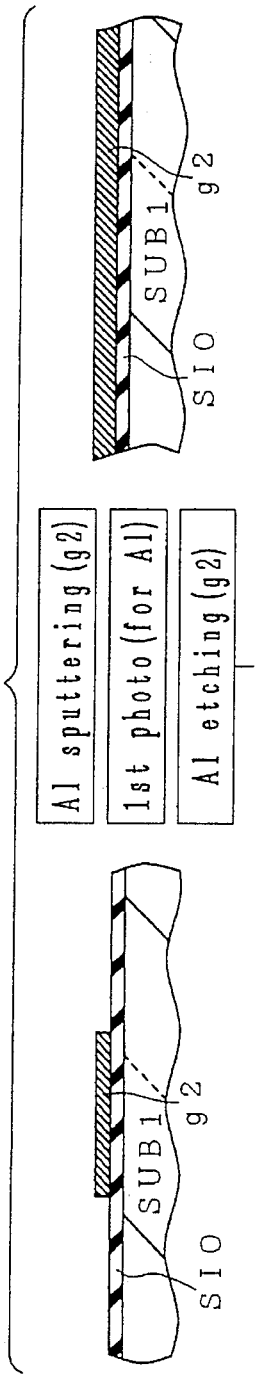
FIG. 13 is a flow chart presenting sections of the pixel portion and the gate terminal portion and showing Steps A to C of manufacturing the side of a substrate SUB1.
Figure 13B:
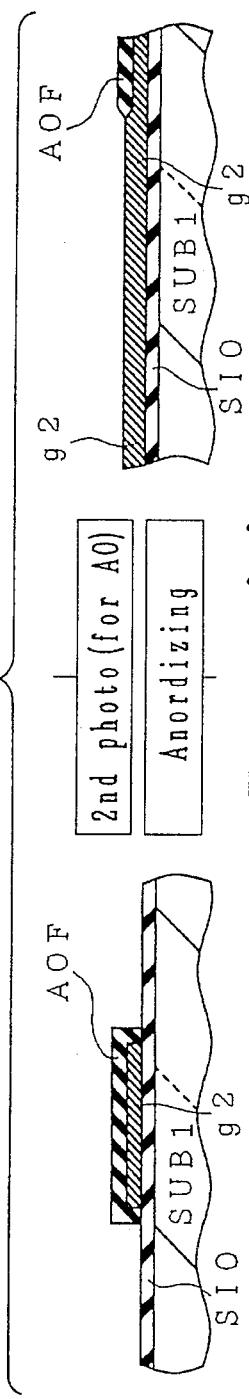
Figure 13C:
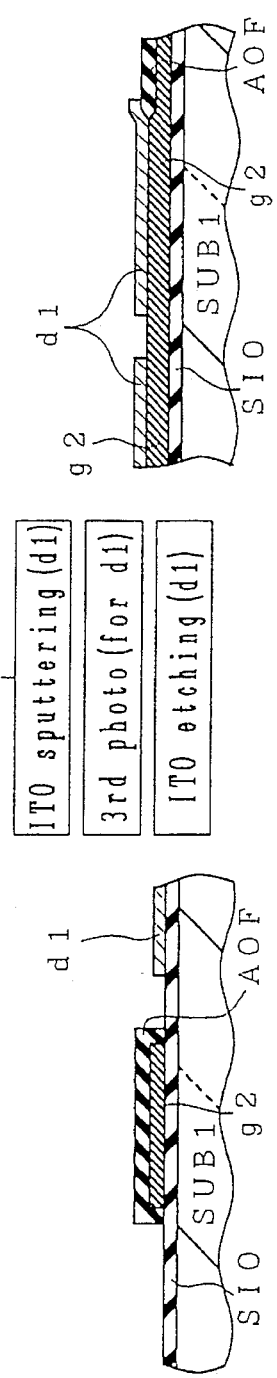
Figure 14A:
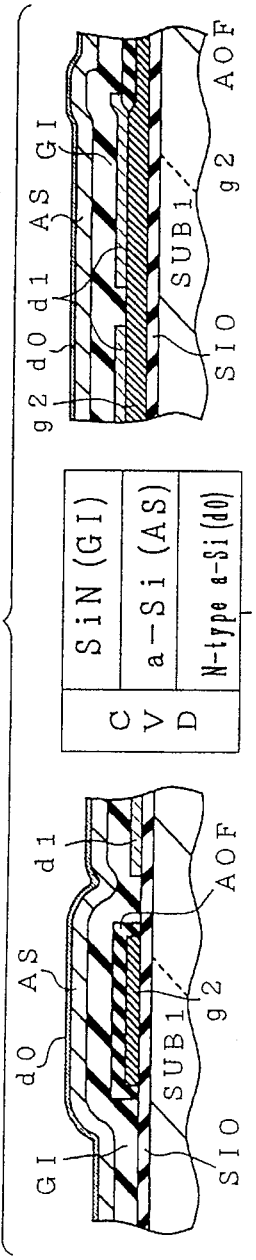
FIG. 14 is a flow chart presenting sections of the pixel portion and the gate terminal portion and showing Steps D to F of manufacturing the side of a substrate SUB1.
Figure 14B:
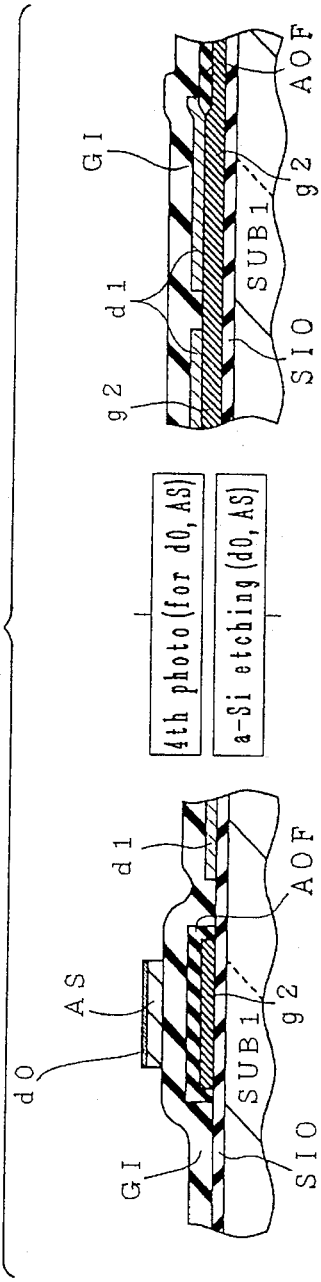
Figure 14C:
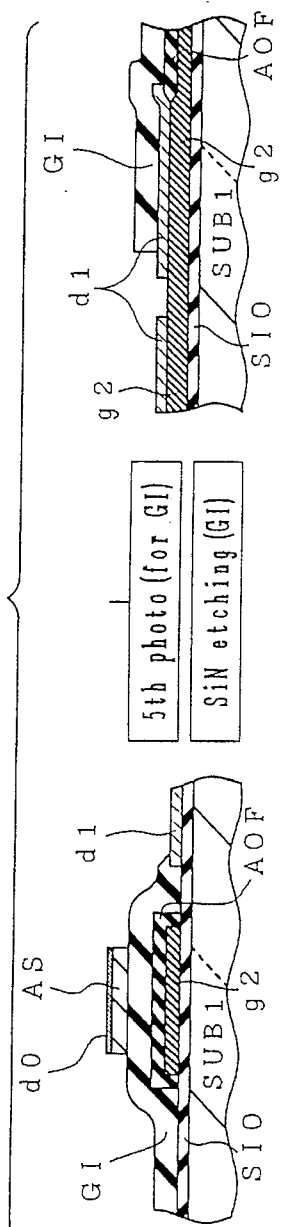

With reference to FIGS. 13 to 15, here will be described a method of manufacturing the aforementioned liquid crystal display device of the side of the substrate SUB1. Incidentally, the letters appearing at the centers of those figures designate the abbreviations of steps. The lefthand sides present the working flows of the pixel portion shown in FIG. 3, and the righthand sides present sections in the vicinity of the gate terminal shown in FIG. 10. The Steps A to I excepting the Step D are divided to correspond to the individual photographic treatments, and all the sections of the individual step illustrate the stages at which the photoresist is removed after the photographic treatments. Incidentally, these photographic treatments are herein termed to indicate a series of works from the application of the photoresist through the selective exposure using the mask to the development, and their repeated description will be omitted. The description will be made according to the divided steps.

Step A, FIG. 13

The lower transparent glass substrate SUB1 made of 7059 glass (known under the trade name) is dipped to have its two faces formed with the silicon oxide films SIO and is then baked at 500° C. for sixty minutes. The lower transparent glass substrate SUB1 is formed thereon by the sputtering with the second conductive film g2 made of Al, Al—Ta, Al—Ti, Al—Ta—Ti or other Al alloy to have a thickness of 2,800 angstroms. After the photographic treatment, the second conductive film g2 is selectively etched with a mixed acid solution of phosphoric acid, nitric acid and glacial acetic acid. As a result, there are formed: the anodized bus line SHG for connecting the gate terminal GTM, the drain terminal DTM and the gate terminal GTM; the bus line SHd for short-circuiting the drain terminal DTM; and the (not-shown) anodized pad connected with the anodized bus line SHg.

Step B, FIG. 13

After the photographic treatment (or after formation of the aforementioned anodized mask AO), the substrate SUB1 is dipped in the anodizing liquid prepared by diluting the solution, which has been prepared by 3% of tartaric acid with ammonia to a PH of 6.25±0.05, with a solution of ethylene glycol at the ratio of 1:9 so that the degassing current density may be adjusted to 0.5 mA/cm$^2$ (i.e., for a constant current degassing operation). Next, the anodization is performed till the degassing voltage necessary for forming the $Al_2O_3$ having a predetermined thickness reaches 125 V. After this, that state is desirably left for about several ten minutes (i.e., for a constant voltage degassing operation). This is important for forming a uniform $Al_2O_3$ film. As a result, the conductive film g2 is anodized to form the anodized film AOF having a thickness of 1,800 angstroms over the scanning signal line GL, the gate electrode GT and the electrode PL1.

Step C, FIG. 15

The first conductive film d1 formed of the ITO film to have a thickness of 1,400 angstroms is formed by the sputtering. After the photographic treatment, the first conductive film d1 is etched by using the mixed acid solution of hydrochloric acid and nitric acid as the etching liquid, to form the uppermost layer of the gate terminal GTM and the drain terminal DTM and the transparent pixel electrode ITO1.

Step D, FIG. 14

Ammonia gas, silane gas and nitrogen gas are introduced into the plasma CVD apparatus to form the silicon nitride film having a thickness of 2,000 angstroms, and silane gas and hydrogen gas are introduced into the plasma CVD apparatus to form the i-type amorphous Si film having a thickness of 2,000 angstroms. After this, hydrogen gas and phosphine gas are introduced into the plasma CVD apparatus to form the N(+) type amorphous Si film having a thickness of 300 angstroms.

Step E, FIG. 14

After the photographic treatment, $SF_6$ and $CCl_4$ are used as the dry etching gas to etch the N(+) type amorphous Si film and the i-type amorphous Si film selectively, to form the island of the i-type semiconductor layer AS.

Step F, FIG. 14

After the photographic treatment, $SF_6$ is used as the dry etching gas to etch the silicon nitride film selectively.

Step G, FIG. 15

The second conductive film d2 of Cr having a thickness of 600 angstroms is formed by the sputtering, and the third conductive film d3 of Al—Pd, Al—Si, Al—Si—Ti or Al—Si—Cu having a thickness of 4,000 angstroms is formed by the sputtering. After the photographic treatment, the third conductive film d3 is etched with a liquid similar to that of Step A, and the second conductive film d2 is etched with ceric ammonium nitrate solution to form the video signal line DL, the source electrode SD1 and the drain electrode SD2. Next, CCl$_4$ and SF$_6$ are introduced into the dry etching apparatus to etch the N(+) film amorphous Si film thereby to remove the N(+) type semiconductor layer d0 selectively from between the source and the drain.

Step H, FIG. 15

The ammonia gas, silane gas and nitrogen gas are introduced into the plasma CVD apparatus to form the silicon nitride film having a thickness of 1 µm. After the photographic treatment, the silicon nitride film is selectively etched by the photoetching technique using SF$_6$ as the dry etching gas to form the passivation film PSV1.

Entire Construction of Liquid Crystal Display Module

Figure 16:
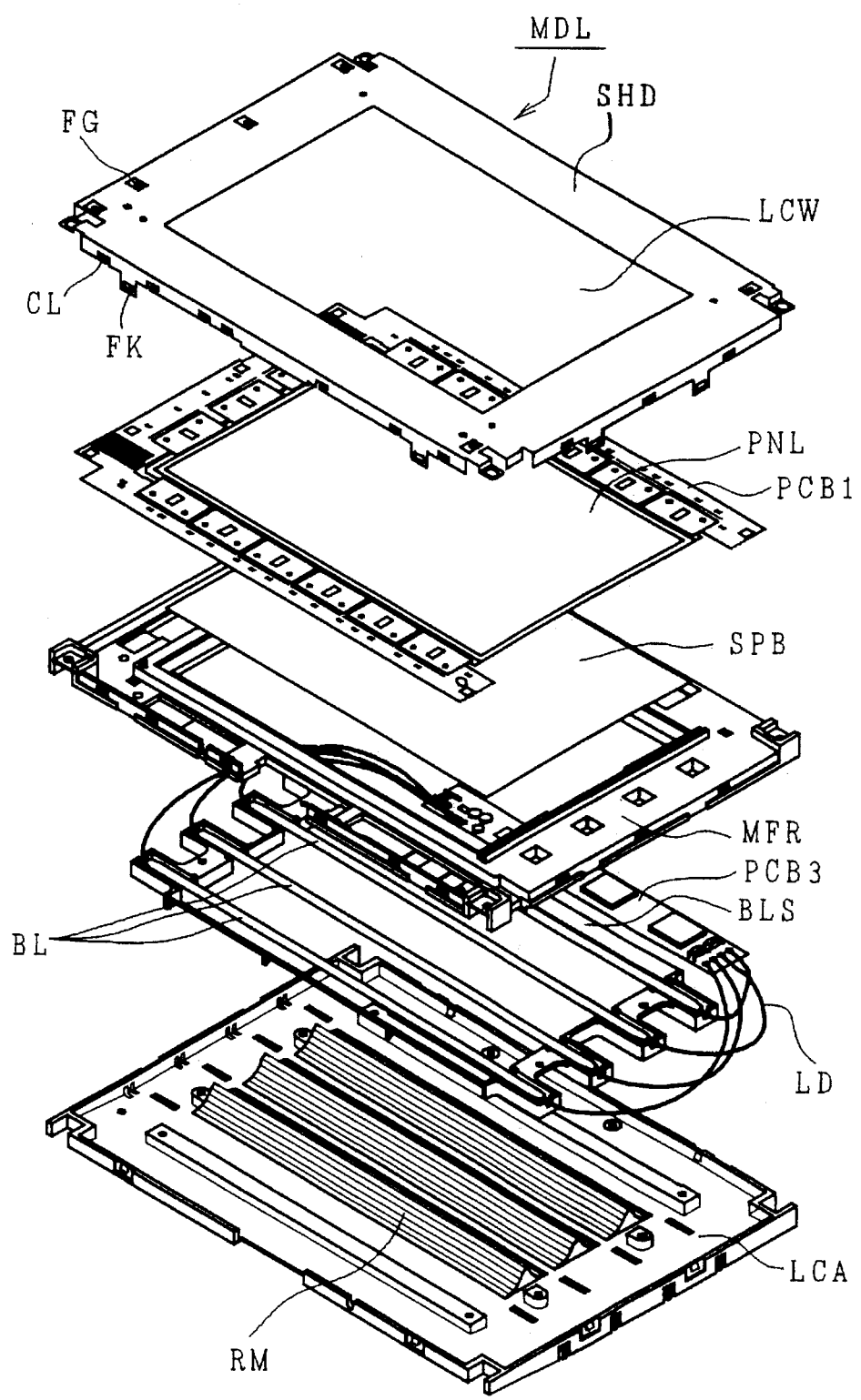
FIG. 16 is an exploded perspective view showing a liquid crystal display module.

FIG. 16 is an exploded perspective view showing the individual components of a liquid crystal display module MDL.

Letters SHD designate a frame-shaped shield case (or metal frame) made of a metal sheet; letters LCW a display window of the shield case; letters SPB an optical diffusion plate; letters MFR a middle frame; letters BL a back light; letters BLS a back light support; and letters LCA a lower case. These components are stacked in the vertical relation, as shown, to assemble the module MDL.

This module MDL is fixed as a whole by claws CL and hooks FK formed on the shield case SHD.

The middle frame MFR is formed into a frame shape having an opening corresponding to the display window LCW, and the frame portion is bulged and recessed to match the shapes and thicknesses of the back light support BLS and various circuit parts and is formed with radiation openings.

The lower case LCA also acts as a reflector of the back light and is formed with reflective mountains RM corresponding to the fluorescent lamps BL so that an efficient refection may be made.

Display Panel PNL and Drive Circuit Substrate PCB1

Figure 17:
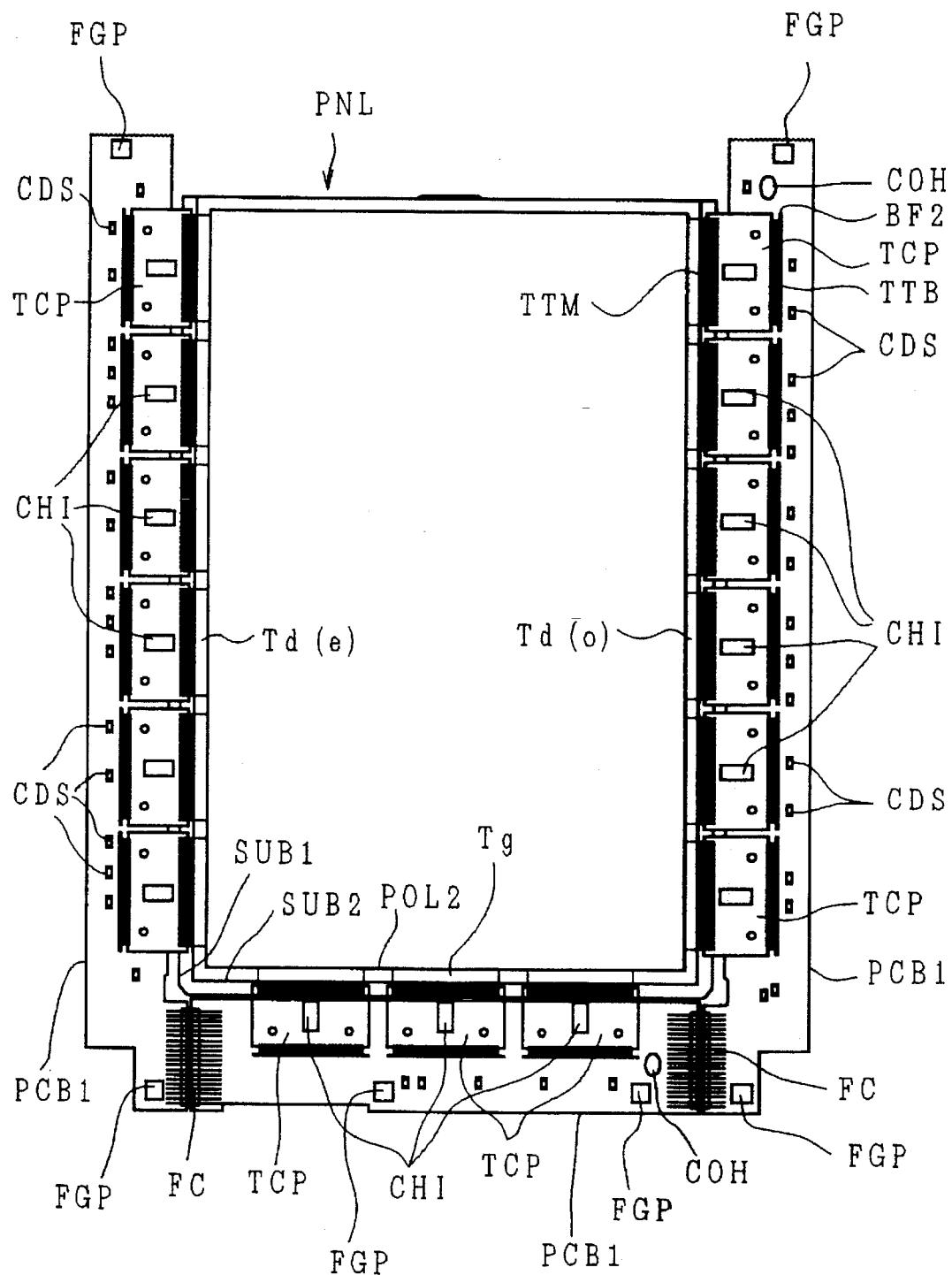
FIG. 17 is a top plan view showing the state in which peripheral drivers are packaged in the liquid crystal display panel.

FIG. 17 is a top plan view showing the state in which the video signal drivers He and Ho and the vertical scanning circuit V are connected with the display panel PNL shown in FIG. 5 and so on.

Letters CHI designate drive IC chips (of which the lower three are the drive IC chips at the side of the vertical scanning circuit whereas the righthand and lefthand six are the drive chips at the side of the video signal driver) for driving the display panel PNL. Letters TCP designate a tape carrier package, in which the driving IC chip CHI is packaged by the tape automated bonding (TAB) method, as will be described with reference to FIGS. 18 and 19, and characters PCB1 designate a driver substrate having the aforementioned TCP and capacitors CDS packaged therein and divided into three. Letters FGP designate frame ground pads which are formed by cutting the shield case SHD and to which are soldered spring-shaped fragments FG. Letters FC designate flat cables for effecting the electric connections between the lower driver substrate PCB1 and the lefthand driver substrate PCB1 and between the lower driver substrate PCB1 and the righthand driver substrate PCB1. The flat cables FC used are prepared, as shown in FIG. 17, by sandwiching a plurality of lead wires (made of phosphor bronze plated with Sn) between a striped polyethylene layer and a polyvinyl alcohol layer.

Connection Structure of TCP

FIG. 18 is a section showing a structure of the tape carrier package, in which the integrated circuit chip CHI constituting the scanning signal driver V and the video signal drivers He and Ho is mounted on the flexible wiring substrate, and FIG. 19 is a section showing an essential portion of the state, in which the tape carrier package is connected with the video signal circuit terminal DTM of the liquid crystal display panel in the present embodiment.

In these Figures, letters TTB designate an input terminal—conductive portion of the integrated circuit CHI, and letters TTM designate an output terminal—conductive portion of the integrated circuit CHI. These portions are made of Cu, for example, and their individual inner leading end portions (as usually called the "inner leads") connected with the bonding pad PAD of the integrated circuit CHI by the so-called "face down bonding method". The terminals TTB and TTM have their outer leading end portions (as usually called the "outer leads") individually connected with the CRT/TFT converter—power supply SUP by the solder and with the liquid crystal display panel PNL by an anisotropic conductive film ACF in a manner to correspond to the input and output of the semiconductor integrated circuit chip CHI. The package TCP has its leading end so connected with the panel as to cover the passivation film PSV1 exposing the connection terminal DTM at the side of the panel PNL, so that the external connection terminal DTM (or GTM) is covered with at least one of the passivation film PSV1 and the package TCP to become strong against the electrolytic corrosion.

Characters BF1 designate a base film made of polyimide, and letters SRS designate a solder resist film for masking the solder so that the solder may not stick to any unnecessary portion. The gap outside of the seal pattern SL between the upper and lower glass substrates is protected after cleaned with an epoxy resin EPX, and the gap between the package TCP and the upper substrate SUB2 is further filled up with a silicone resin SIL to make the protection multiplex.

Driver Substrate PCB2

Figure 20:
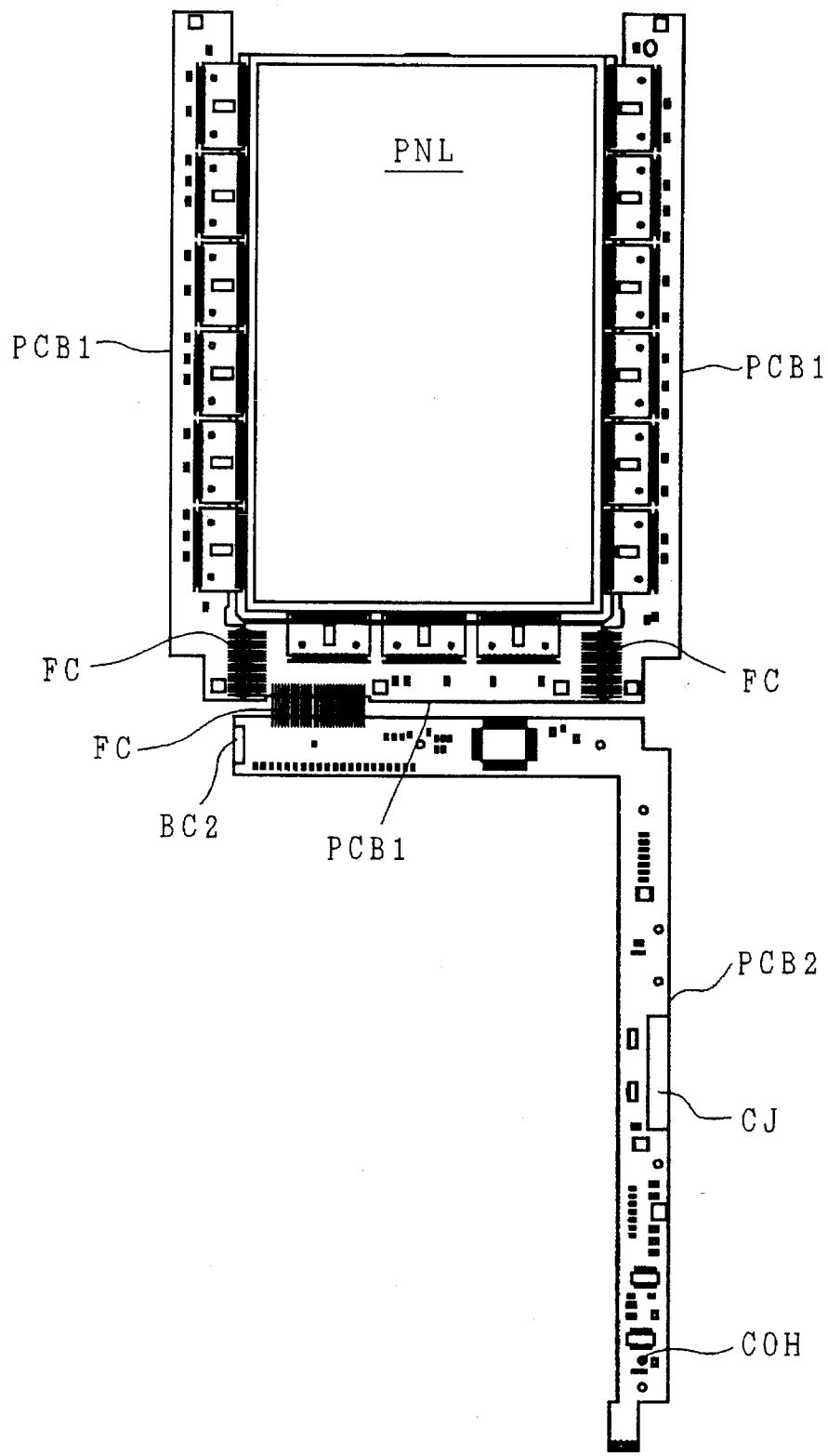
FIG. 20 is a top plan view showing the connection state between a peripheral driver substrate PCB1 (as viewed from the upper face) and a power supply substrate PCB2 (as viewed from the lower face)

A liquid crystal display LCD to be held and mounted in the middle frame MFR has its driver substrate PCB2 is formed into the shape of letter "L", as shown in FIG. 20, to mount electronic parts such as ICs, capacitors and resistors. On this driver substrate PCB2, there is mounted the circuit SUP which includes the power supply for establishing the plurality of stable voltage sources divided from one voltage source, and the circuit for converting the information for the CRT (i.e., Cathode Ray Tube) from the host (i.e., host arithmetic processor) into the information for the TFT liquid crystal display device. Letters CJ designate a connector connecting portion with which is connected the not-shown connector to be connected with the outside. The driver substrate PCB2 and an inverter substrate PCB3 are electrically connected by the back light cable through the connector hole formed in the middle frame MFR.

The driver substrate PCB1 and the driver substrate PCB2 are electrically connected by a foldable flat cable FC. At the assembling time, the driver substrate PCB2 is overlapped on the driver substrate PCB1 by folding the flat cable FC by 180 degrees and is fitted in a predetermined recess of the middle frame MFR.

As is apparent from the description thus far made, according to the liquid crystal display panel of the present invention, it is possible to provide the testing pads which are freed from any electric short-circuiting of the conductive layer by the peeled material.

We claim:

1. A liquid crystal display device comprising:

a liquid crystal display panel including a liquid crystal interposed between first and second transparent plates;

a set of conductive lines disposed on a surface of at least one of said transparent plates, each of said lines having a lower layer made of aluminum or aluminum alloy and an upper layer made of a transparent conductive film; and a set of electrically conductive pads are disposed at respective first ends of said conductive lines, said pads being made of only a transparent conductive film containing neither said aluminum nor aluminum alloy.

2. A liquid crystal display device comprising:

a liquid crystal display panel including a liquid crystal interposed between first and second transparent plates;

a set of conductive lines disposed on a surface of at least one of said transparent plates, each of said lines having a lower layer made of an aluminum or aluminum alloy and an upper layer made of a transparent conductive film;

wherein said conductive lines have respective first and second ends, said second ends being commonly connected to a short-circuiting line and said first ends being connected respectively to a set of electrically conductive pads, and wherein said electrically conductive pads are made of only a transparent conductive film containing neither said aluminum or aluminum alloy, and further wherein said conductive lines are each cut in advance of said second ends to separate each of said conductive lines.

3. The liquid crystal display device according to claim 1 or 2, wherein said aluminum alloy contains tantalum, titanium or both.

4. The liquid crystal display device according to claim 1, 2, or 3, wherein said transparent conductive film, thinner than said aluminum or aluminum alloy film, is formed to override sloped end portion of said aluminum or aluminum alloy film.

5. A liquid crystal display device as recited in claim 1, further comprising:

a short-circuiting line connected to respective second ends of said electrically conductive pads; and an electrically conductive pad, different from any one of said set of pads, connected to the short-circuiting line.

6. A liquid crystal display device as recited in claim 5, wherein each pad in said set of pads is adapted to receive test signals from a probe, said different pad functioning to receive said test signals along individual conductive paths formed between said short-circuiting line and each respective conductive line, and further wherein a user may identify faulty conductive lines by determining whether a test signal input into any one of said pads is detected at said different pad.

7. A liquid crystal display device as recited in claim 6, wherein said conductive lines are cut in advance of said second ends to separate each of said conductive lines from said short-circuiting line.

8. A liquid crystal display device as recited in claim 2, wherein said electrically conductive pads are testing pads.

* * * * *